United States Patent
Fujii

(10) Patent No.: US 10,477,050 B2
(45) Date of Patent: Nov. 12, 2019

(54) IMAGE SCANNER, METHOD, AND COMPUTER-READABLE MEDIUM FOR DETECTING DOCUMENT EDGE POSITIONS

(71) Applicant: BROTHER KOGYO KABUSHIKI KAISHA, Nagoya, Aichi (JP)

(72) Inventor: Isamu Fujii, Yokkaichi (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 0 days.

(21) Appl. No.: 16/162,793

(22) Filed: Oct. 17, 2018

(65) Prior Publication Data
US 2019/0124226 A1    Apr. 25, 2019

(30) Foreign Application Priority Data
Oct. 24, 2017    (JP) ................ 2017-205217

(51) Int. Cl.
*H04N 1/00*    (2006.01)
*H04N 1/387*    (2006.01)
*G06K 9/62*    (2006.01)

(52) U.S. Cl.
CPC ....... *H04N 1/00748* (2013.01); *G06K 9/6202* (2013.01); *H04N 1/0071* (2013.01); *H04N 1/00702* (2013.01); *H04N 1/00737* (2013.01); *H04N 1/3878* (2013.01)

(58) Field of Classification Search
USPC ...... 358/1.1–3.29, 1.11–1.18, 488, 504–538; 382/266–269, 287, 318
See application file for complete search history.

(56) References Cited

U.S. PATENT DOCUMENTS

2001/0015821 A1*  8/2001  Namizuka ................ G06T 3/40
                                                         358/1.15
2010/0141991 A1*  6/2010  Yoshida ............... H04N 1/3878
                                                         358/1.15

FOREIGN PATENT DOCUMENTS

JP    H09-027909 A    1/1997
JP    3670571 B2      7/2005
JP    3804906 B2      8/2006

* cited by examiner

*Primary Examiner* — Marcellus J Augustin
(74) *Attorney, Agent, or Firm* — Scully, Scott, Murphy & Presser, P.C.

(57) ABSTRACT

An image scanner includes a document detector configured to define a detection range on the basis of a reference position, select a target area from among a plurality of areas within the detection range, in ascending order of distance between an area to be selected as the target area and the reference position, determine whether the target area is a document outside area, a document inside area, or a document edge area, by comparing a black pixel density of the target area with a plurality of thresholds, when that the target area is the document outside area or the document inside area, select one or more new target areas from among the plurality of areas within the detection range, and when the target area is the document edge area, detect a specific position in the target area as a position of the lateral side.

13 Claims, 12 Drawing Sheets

IMAGE SCANNER, METHOD, AND COMPUTER-READABLE MEDIUM FOR DETECTING DOCUMENT EDGE POSITIONS

CROSS-REFERENCE TO RELATED APPLICATION

This application claims priority under 35 U.S.C. § 119 from Japanese Patent Application No. 2017-205217 filed on Oct. 24, 2017. The entire subject matter of the application is incorporated herein by reference.

BACKGROUND

Technical Field

Aspects of the present disclosure are related to an image scanner, a method, and a non-transitory computer-readable medium for detecting document edge positions.

Related Art

An image scanner has been known that is configured to, while scanning a sheet placed on a document table in a sub scanning direction, determine whether the sheet exists in a scanning position, based on a change in density of the scanned image in the sub scanning direction. Specifically, the known image scanner may include a contact glass as the document table and a document retaining plate for pressing the sheet placed on the contact glass from above, and may optically scan the sheet from under the contact glass. If the sheet does not exist in the scanning position in the sub scanning direction, the image scanner may scan the document retaining plate. In response to detecting a change in density of the scanned image from a density of a background color of the sheet to a density representing the document retaining plate, the image scanner may recognize that the sheet does not exist in the scanning position, and may interrupt the image scanning.

SUMMARY

However, there is a potential risk that the known image scanner might erroneously detect a sheet as the document retaining plate when scanning the sheet having a background color of which the density is close to the density representing the document retaining plate. When such erroneous detection occurs, the image scanner interrupts the image scanning without completely scanning the sheet. For instance, discoloration of the document retaining plate may cause the erroneous detection as exemplified above.

Aspects of the present disclosure are advantageous to provide one or more improved techniques, for an image scanner, which make it possible to accurately detect edges of a document sheet from a scanned image of the sheet and correctly determine whether the sheet exists in a scanning position, based on the accurate detection of the document edges.

According to aspects of the present disclosure, an image scanner is provided, which includes a document table configured to support a rectangular sheet placed thereon, the document table having a specific position thereon where one of four corners of the sheet is placed as a reference corner, an image sensor configured to repeatedly perform line scanning to scan the sheet placed on the document table in a main scanning direction while moving in a sub scanning direction perpendicular to the main scanning direction, thereby generating image data representing a scanned image of the sheet, a binarizer configured to binarize the image data generated by the image sensor; and a document detector. The document detector is configured to receive first image data from the binarizer, the first image data being generated by binarizing image data generated by the image sensor repeatedly performing the line scanning a particular number of times while moving in the sub scanning direction from a scanning start position, detect a first position of a lateral side of the sheet within a first scanned image represented by the received first image data, the lateral side extending in the sub scanning direction from a non-reference corner of the sheet, the non-reference corner being opposed to the reference corner across an upper side of the sheet in the main scanning direction, the upper side extending in the main scanning direction from the reference corner, calculate an inner black pixel density and an outer black pixel density based on the first image data, the inner black pixel density being a density of black pixels in an inner particular area, the outer black pixel density being a density of black pixels in an outer particular area, the inner particular area and the outer particular area being defined with the detected first position of the lateral side as a boundary therebetween, set a plurality of thresholds based on the calculated inner black pixel density and the calculated outer black pixel density, each time the image sensor repeatedly performs the line scanning a predetermined number of times while moving in the sub scanning direction, perform an edge detecting process to detect a second position of the lateral side by detecting a document edge corresponding to the lateral side in the main scanning direction within a second scanned image represented by second image data received from the binarizer, the second image data being generated by binarizing image data generated by the line scanning repeated the predetermined number of times, in the edge detecting process performed for a first time, set a reference position based on the detected first position of the lateral side, in the edge detecting process performed for a second or later time, set the reference position based on the second position of the lateral side detected in a previous edge detecting process, and in each edge detecting process, define a detection range on the basis of the set reference position, select a target area from among a plurality of areas within the defined detection range, in ascending order of distance between an area to be selected as the target area and the reference position, determine whether the selected target area is a document outside area, a document inside area, or a document edge area, by comparing a black pixel density of the target area with the plurality of thresholds, in response to determining that the target area is the document outside area or the document inside area, select one or more new target areas from among the plurality of areas within the detection range, and in response to determining that the target area is the document edge area, detect a specific position in the target area as the second position of the lateral side.

According to aspects of the present disclosure, further provided is a method implementable on a processor coupled with an image scanner. The image scanner includes a document table configured to support a rectangular sheet placed thereon, the document table having a specific position thereon where one of four corners of the sheet is placed as a reference corner, an image sensor configured to repeatedly perform line scanning to scan the sheet placed on the document table in a main scanning direction while moving in a sub scanning direction perpendicular to the main scanning direction, thereby generating image data representing a scanned image of the sheet, and a binarizer configured to binarize the image data generated by the image sensor. The method includes receiving first image data from the binarizer, the first image data being generated by binarizing image data generated by the image sensor repeatedly performing the line scanning a particular number of times while moving in the sub scanning direction from a scanning start position, detecting a first position of a lateral side of the sheet within a first scanned image represented by the received first image data, the lateral side extending in the sub scanning direction from a non-reference corner of the sheet, the non-reference corner being opposed to the reference corner across an upper side of the sheet in the main scanning direction, the upper side extending in the main scanning direction from the reference corner, calculating an inner black pixel density and an outer black pixel density based on the first image data, the inner black pixel density being a density of black pixels in an inner particular area, the outer black pixel density being a density of black pixels in an outer particular area, the inner particular area and the outer particular area being defined with the detected first position of the lateral side as a boundary therebetween, setting a plurality of thresholds based on the calculated inner black pixel density and the calculated outer black pixel density, each time the image sensor repeatedly performs the line scanning a predetermined number of times while moving in the sub scanning direction, performing an edge detecting process to detect a second position of the lateral side by detecting a document edge corresponding to the lateral side in the main scanning direction within a second scanned image represented by second image data received from the binarizer, the second image data being generated by binarizing image data generated by the line scanning repeated the predetermined number of times, in the edge detecting process performed for a first time, setting a reference position based on the detected first position of the lateral side, in the edge detecting process performed for a second or later time, setting the reference position based on the second position of the lateral side detected in a previous edge detecting process, and in each edge detecting process, defining a detection range on the basis of the set reference position, selecting a target area from among a plurality of areas within the defined detection range, in ascending order of distance between an area to be selected as the target area and the reference position, determining whether the selected target area is a document outside area, a document inside area, or a document edge area, by comparing a black pixel density of the target area with the plurality of thresholds, in response to determining that the target area is the document outside area or the document inside area, selecting one or more new target areas from among the plurality of areas within the detection range, and in response to determining that the target area is the document edge area, detecting a specific position in the target area as the second position of the lateral side.

According to aspects of the present disclosure, further provided is a non-transitory computer-readable medium storing computer-readable instructions that are executable by a processor coupled with an image scanner. The image scanner includes a document table configured to support a rectangular sheet placed thereon, the document table having a specific position thereon where one of four corners of the sheet is placed as a reference corner, an image sensor configured to repeatedly perform line scanning to scan the sheet placed on the document table in a main scanning direction while moving in a sub scanning direction perpendicular to the main scanning direction, thereby generating image data representing a scanned image of the sheet, and a binarizer configured to binarize the image data generated by the image sensor. The instructions are configured to, when executed by the processor, cause the processor to receive first image data from the binarizer, the first image data being generated by binarizing image data generated by the image sensor repeatedly performing the line scanning a particular number of times while moving in the sub scanning direction from a scanning start position, detect a first position of a lateral side of the sheet within a first scanned image represented by the received first image data, the lateral side extending in the sub scanning direction from a non-reference corner of the sheet, the non-reference corner being opposed to the reference corner across an upper side of the sheet in the main scanning direction, the upper side extending in the main scanning direction from the reference corner, calculate an inner black pixel density and an outer black pixel density based on the first image data, the inner black pixel density being a density of black pixels in an inner particular area, the outer black pixel density being a density of black pixels in an outer particular area, the inner particular area and the outer particular area being defined with the detected first position of the lateral side as a boundary therebetween, set a plurality of thresholds based on the calculated inner black pixel density and the calculated outer black pixel density, each time the image sensor repeatedly performs the line scanning a predetermined number of times while moving in the sub scanning direction, perform an edge detecting process to detect a second position of the lateral side by detecting a document edge corresponding to the lateral side in the main scanning direction within a second scanned image represented by second image data received from the binarizer, the second image data being generated by binarizing image data generated by the line scanning repeated the predetermined number of times, in the edge detecting process performed for a first time, set a reference position based on the detected first position of the lateral side, in the edge detecting process performed for a second or later time, set the reference position based on the second position of the lateral side detected in a previous edge detecting process, and in each edge detecting process, define a detection range on the basis of the set reference position, select a target area from among a plurality of areas within the defined detection range, in ascending order of distance between an area to be selected as the target area and the reference position, determine whether the selected target area is a document outside area, a document inside area, or a document edge area, by comparing a black pixel density of the target area with the plurality of thresholds, in response to determining that the target area is the document outside area or the document inside area, select one or more new target areas from among the plurality of areas within the detection range, and in response to determining that the target area is the document edge area, detect a specific position in the target area as the second position of the lateral side.

BRIEF DESCRIPTION OF THE ACCOMPANYING DRAWINGS

Figure 10:
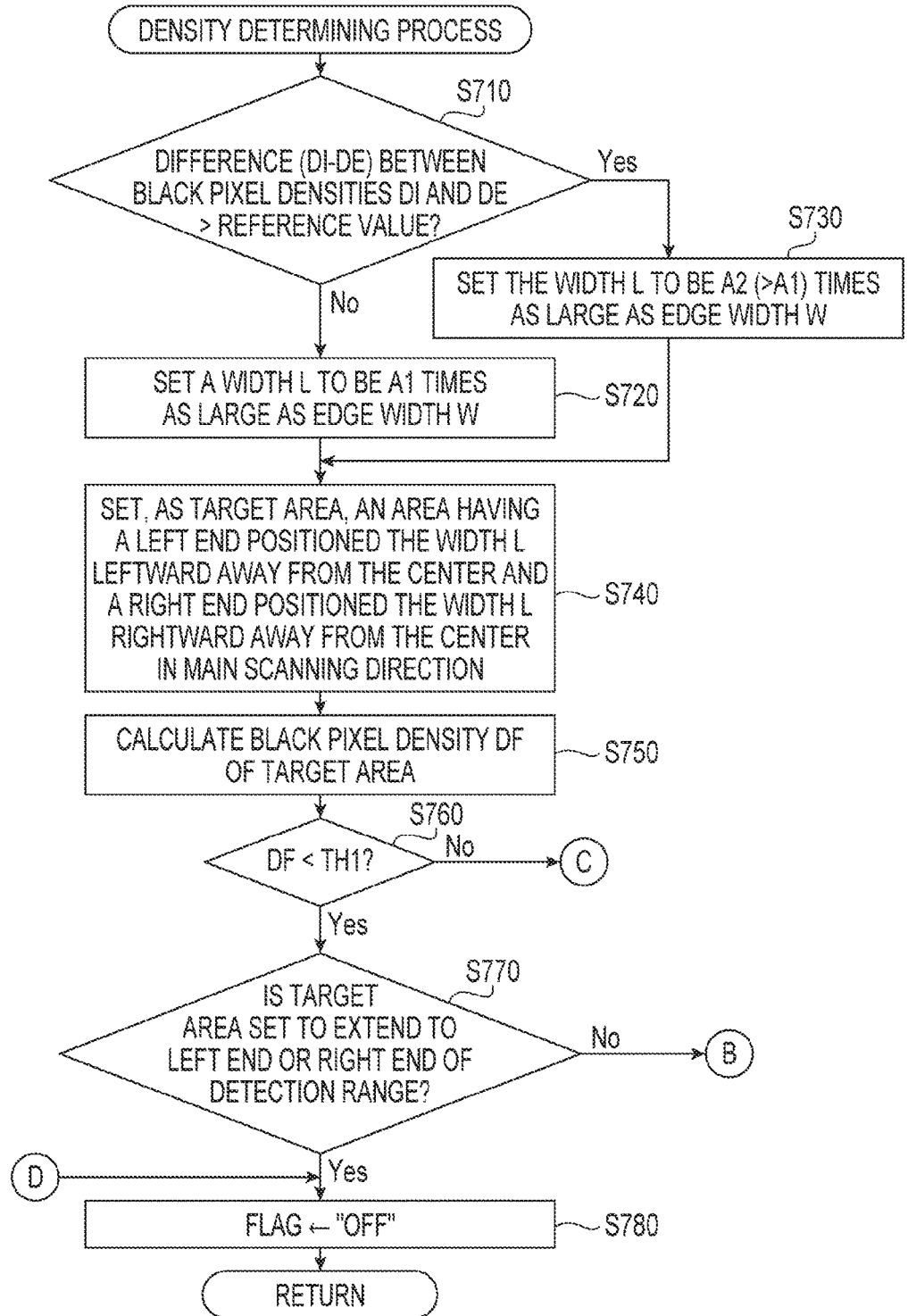
Figure 11:
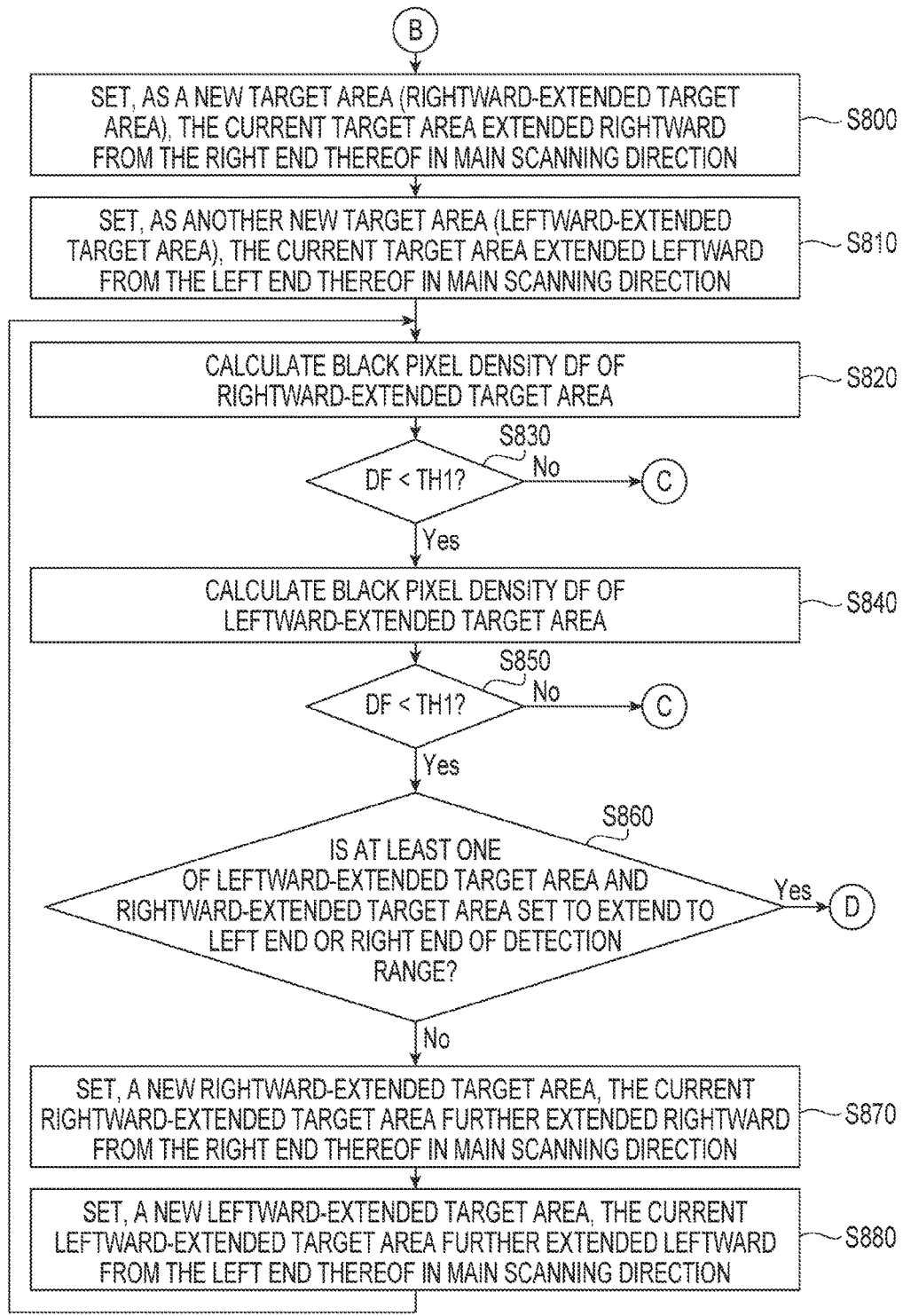
Figure 12:
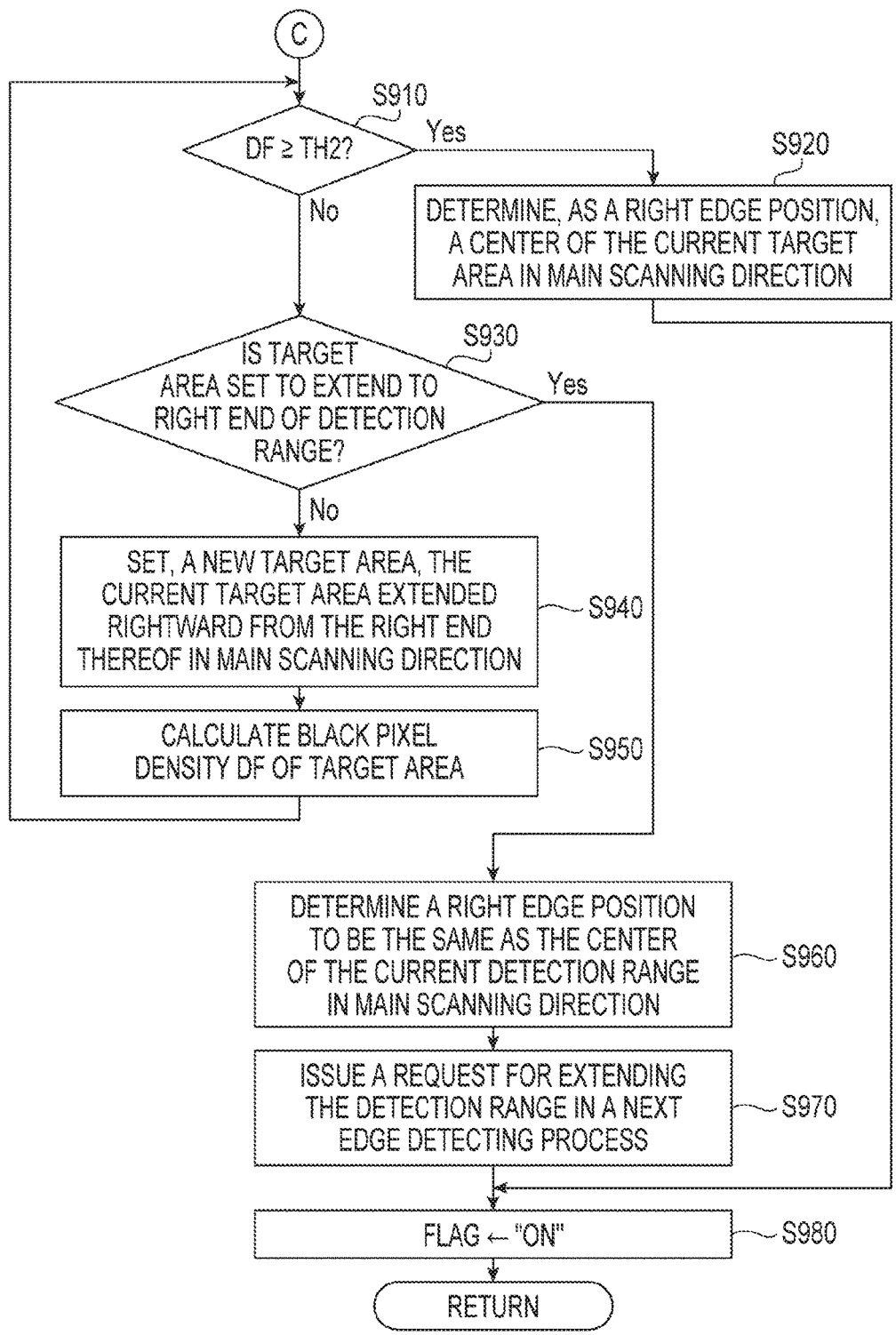

FIGS. 10, 11, and 12 are flowcharts showing a procedure of a density determining process to be performed by the document detector in the illustrative embodiment according to one or more aspects of the present disclosure.

Figure 13:
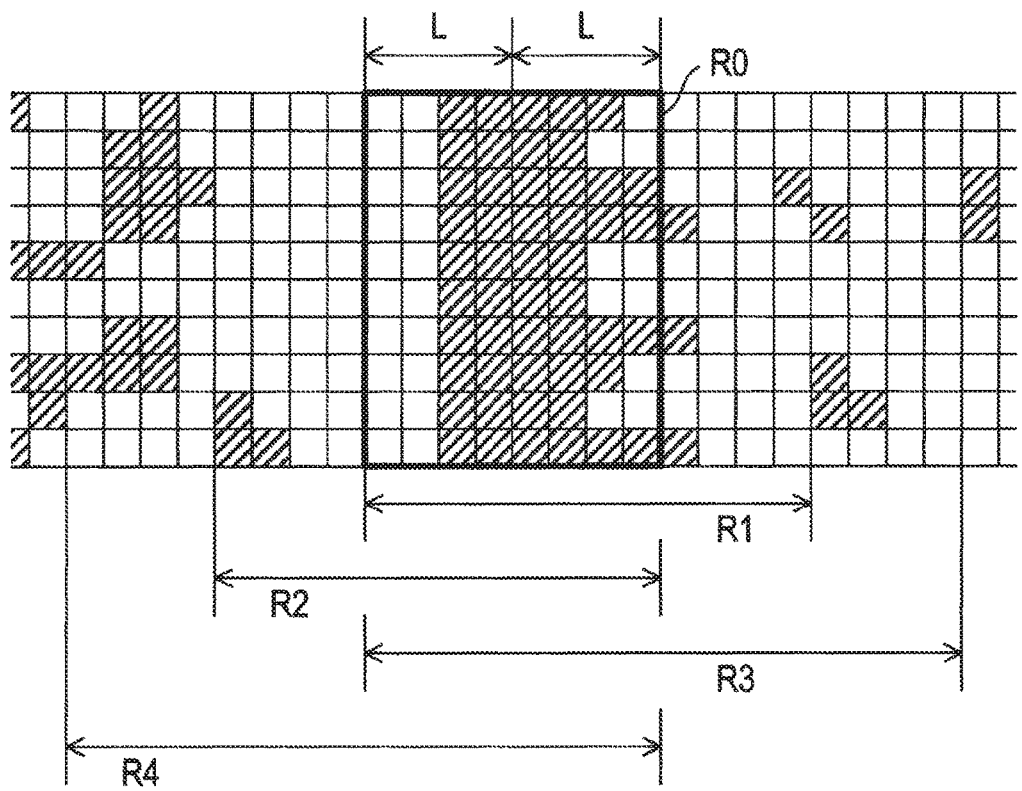

FIG. 13 is an illustration for explaining how to set a target area within a detection range in the density determining process, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Figure 1:
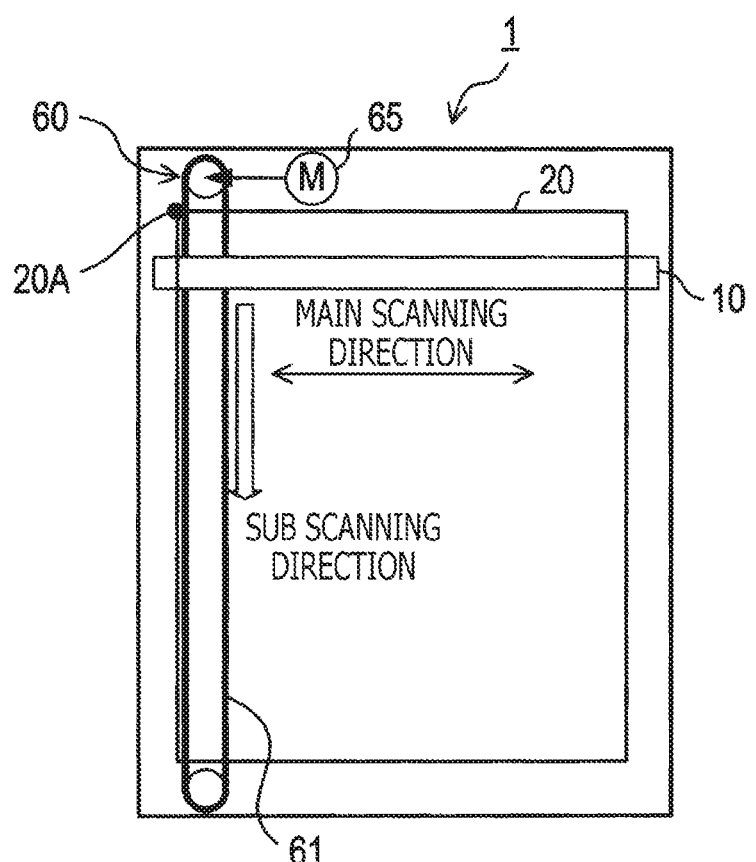
FIG. 1 is a partially transparent plan view showing a configuration of an image scanner in an illustrative embodiment according to one or more aspects of the present disclosure.

Hereinafter, an illustrative embodiment according to aspects of the present disclosure will be described with reference to the accompanying drawings. As shown in FIG. 1, an image scanner 1 of the illustrative embodiment is a flatbed type image scanner. The image scanner 1 includes a document table 20 and a line image sensor 10. The line image sensor 10, extending long in a main scanning direction, is configured to perform line scanning to linearly scan a sheet placed on the document table 20 in the main scanning direction. The image scanner 1 is configured to cause the line image sensor 10 to repeatedly perform the line scanning while moving the line image sensor 10 in a sub scanning direction perpendicular to the main scanning direction, thereby generating image data representing a scanned image of the sheet placed on the document table 20.

For instance, the generated image data may be transmitted to an external device such as a personal computer. When the image scanner 1 is included in a digital multi-function peripheral, the image data may be used for the multi-function peripheral to make a copy of the document sheet.

The document table 20 has a corner portion 20A for positioning the document sheet relative to the document table 20. For instance, a rectangular sheet Q having four corners may be placed in such a manner that a corner QA of the four corners is put in a correct position relative to the corner portion 20A (see FIG. 7).

The document table 20 includes a transparent platen glass. FIG. 1 is a plan view showing elements of the image scanner 1 that are positioned under the document table 20 and visible through the transparent platen glass. The line image sensor 10 is disposed to scan, through the platen glass from below, the sheet Q placed on an upper surface of the platen glass in the main scanning direction. More specifically, the line image sensor 10 is disposed movably along the sub scanning direction under the document table 20.

Figure 2:
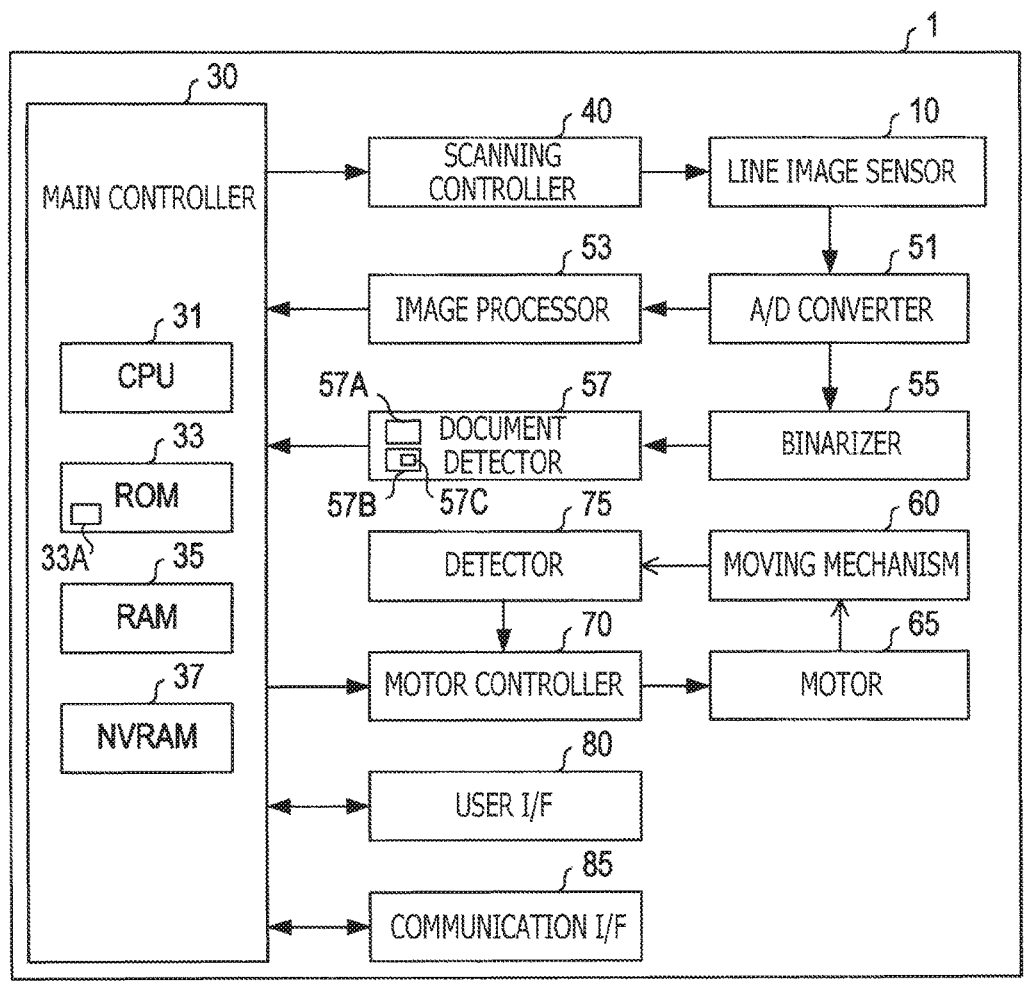
FIG. 2 is a block diagram showing an electrical configuration of the image scanner in the illustrative embodiment according to one or more aspects of the present disclosure.

As shown in FIG. 2, the image scanner 1 further includes a main controller 30, a scanning controller 40, an A/D converter 51, an image processor 53, a binarizer 55, a document detector 57, a moving mechanism 60, a motor 65, a motor controller 70, a detector 75, a user I/F ("I/F" is an abbreviation of "interface") 80, and a communication I/F 85.

The main controller 30 is configured to take overall control of the image scanner 1. The main controller 30 includes a CPU 31, a ROM 33, a RAM 35, and an NVRAM 37. The CPU 31 is configured to perform processes according to programs 33A stored in the ROM 33. The RAM 35 is usable as a work area when the CPU 31 performs processes. The NVRAM 37 includes a flash memory or an EEPROM. The image scanner 1 may implement various functions when the CPU 31 performs the processes according to the programs 33A stored in the ROM 33.

The scanning controller 40 is configured to control the line image sensor 10 in accordance with instructions from the main controller 30, thereby performing image scanning on a line-by-line basis. The line image sensor 10 is a contact image sensor (hereinafter referred to as a "CIS"). In each line scanning to linearly scan the sheet Q placed on the document table 20 in the main scanning direction, the line image sensor 10 emits light toward the sheet Q, receives reflected light from the sheet Q by a plurality of light receiving elements (not shown) arranged along the main scanning direction, and serially outputs, as analog signals, a group of pixel data each piece of which represents a quantity of light received by a corresponding one of the light receiving elements. Namely, the group of pixel data serially output in each line scanning corresponds to image data representing a scanned image of one line.

Thus, the line image sensor 10 optically scans the sheet Q placed on the document table 20 on a line-by-line basis while moving in the sub scanning direction, thereby generating image data representing a scanned image of the sheet Q. The image data generated in each line scanning is converted into digital signals through the A/D converter 51 and then transmitted to the image processor 53 and the binarizer 55.

The image processor 53 is configured to perform image processing (e.g., gamma correction) for the digital image data output from the A/D converter 51 and then transmit the processed image data to the main controller 30. Thereby, the image data representing a scanned image of each single line is sequentially stored and accumulated into the RAM 35 of the main controller 30 in response to the line scanning being repeatedly performed from one line to another. Finally, image data representing a whole scanned image of the sheet Q is generated. For instance, the generated image data may be color image data.

The binarizer 55 is configured to binarize the image data received from the A/D converter 51 and transmit the binarized image data to the document detector 57. The binarized image data represents a value of each pixel with "0" for black or "1" for white. The binarization may be performed with differential processing.

The document detector 57 is configured to, based on the binarized image data, detect positions of an upper side, a left side, a right side, and a lower side of the sheet Q in the scanned image represented by the image data, and then transmit the detection results to the main controller 30. The upper side is an upstream side of the sheet Q in the sub scanning direction and extends along the main scanning direction. Further, the upper side has the corner QA as a left end thereof. As described above, the corner QA is a reference corner QA to be placed in a correct position relative to the corner portion 20A of the document table 20. The right side extends along the sub scanning direction from a non-reference corner QB that is opposed to the reference corner QA across the upper side in the main scanning direction.

For instance, the document detector 57 may include one or more specific circuits (not shown), and may be configured to perform necessary processes by the one or more specific circuits. In another exemplary configuration, the document detector 57 may include a general-purpose processor 57A and a memory 57B storing programs 57C (see FIG. 2) configured to, when executed by the processor 57A, cause the processor 57A to perform the necessary processes. The necessary processes include a below-mentioned document detecting process (see FIG. 4). The memory 57B may include at least one of a RAM, a ROM, and an NVRAM.

Based on the detection results received from the document detector 57, the main controller 30 specifies a document area in the scanned image represented by the image data received from the image processor 53. Further, the main controller 30 performs a trimming process to extract data of the specified document area from the image data.

The moving mechanism 60 is configured to move the line image sensor 10 along the sub scanning direction. The moving mechanism 60 is driven by the motor 65. The moving mechanism 60 exemplified in FIG. 1 includes an endless belt 61. The line image sensor 10 is attached to the endless belt 61. In response to receiving a driving force from the motor 65, the endless belt 61 revolves thereby moving the line image sensor 10 in the sub scanning direction. Thus, the line image sensor 10 moves in the sub scanning direction in accordance with the revolution of the endless belt 61, while being supported by guides (not shown).

According to instructions from the main controller 30, the motor controller 70 performs feedback control of the rotation of the motor 65 based on information (including a rotational position and a rotational speed) received from the detector 75. Thereby, the motor controller 70 controls movement of the line image sensor 10 via the moving mechanism 60. For instance, the detector 75 may include an encoder (not shown) attached to a rotational shaft of the motor 65 and a signal processing circuit (not shown) for converting output signals from the encoder into the rotational position and the rotational speed.

The user I/F 80 is configured to accept user operations and display information directed to the user. For instance, the user I/F 80 may include an LCD and a touch panel on the LCD. A signal, issued in response to a user operation accepted via the user I/F 80, is transmitted to the main controller 30. For instance, the user I/F 80 may display thereon various kinds of information for the user, under control by the main controller 30.

The communication I/F 85 is configured to communicate with external devices. For instance, the communication I/F 85 may convey instructions from an external device to the main controller 30. Further, the communication I/F 85 may transmit the image data representing the scanned image of the sheet Q from the main controller 30 to an external device. Specific examples of the communication I/F 85 may include a LAN I/F and a USB I/F.

Figure 3:
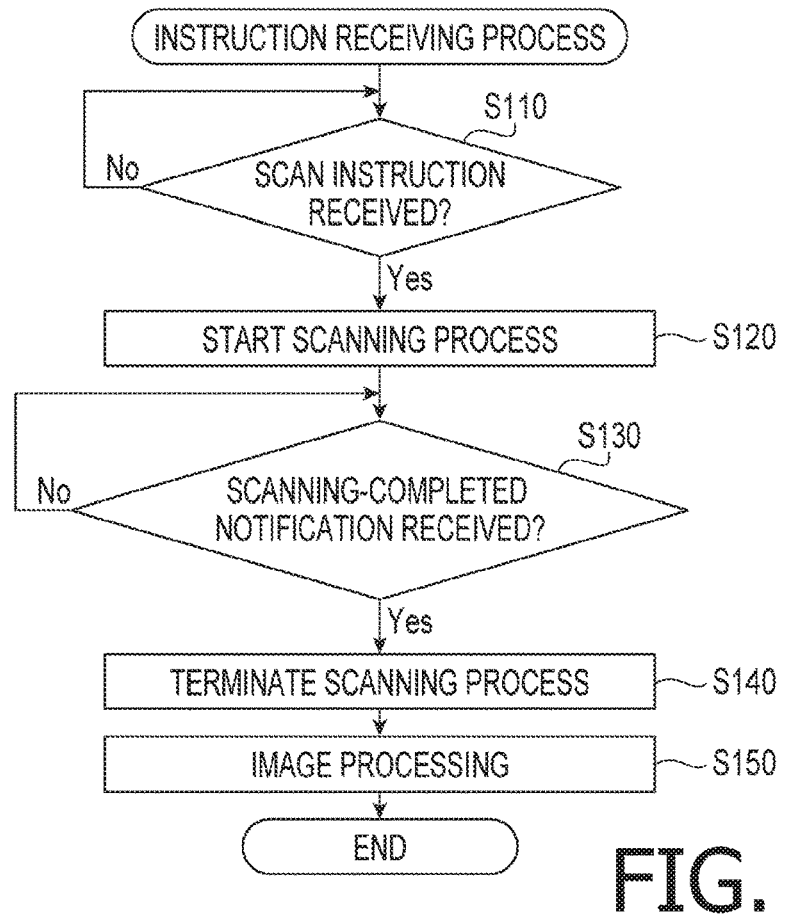
FIG. 3 is a flowchart showing a procedure of an instruction receiving process to be performed by a main controller of the image scanner in the illustrative embodiment according to one or more aspects of the present disclosure.

In response to receiving an instruction from an external device or via the user I/F 80, the main controller 30 performs a process corresponding to the instruction. Specifically, the main controller 30 repeatedly performs an instruction receiving process (see FIG. 3) and waits until a scan instruction is input by the user via the external device or the user I/F 80 (S110). Then, in response to a scan instruction being input, the main controller 30 starts a scanning process to scan the image of the sheet Q (S120).

In the scanning process, the main controller 30 instructs the motor controller 70 to control the motor 65 so as to move the line image sensor 10 in the sub scanning direction at a constant speed corresponding to a scanning resolution. Further, the main controller 30 instructs the scanning controller 40 to control the line image sensor 10 to perform the line scanning at regular intervals of a constant period of time corresponding to the scanning resolution.

Further, the main controller 30 activates the image processor 53 and the document detector 57, sequentially stores and accumulates image data received from the image processor 53 into the RAM 35, and receives, from the document detector 57, the detection results (including information on a position and a skew of the sheet Q) regarding the sheet Q.

Afterward, in response to receiving from the document detector 57 a notification (hereinafter, which may be referred to as a "scanning-completed notification") that image scanning from a leading end (i.e., an upstream end) to a trailing end (i.e., a downstream end) of the sheet Q in the sub scanning direction has been completed (S130: Yes), the main controller 30 terminates the scanning process (S140). At a time when the scanning process is terminated, the main controller 30 transmits a stop instruction to the scanning controller 40 and the motor controller 70, thereby causing the line image sensor 10 to stop repeatedly performing the line scanning, and causing the moving mechanism 60 to stop moving the line image sensor 10.

Afterward, the main controller 30 performs image processing such as a trimming process, for the image data representing the whole scanned image stored and accumulated in the RAM 35 (S150). Then, the main controller 30 terminates the instruction receiving process shown in FIG. 3. In the trimming process, the main controller 30 extracts the document area from the image data.

Figure 4:
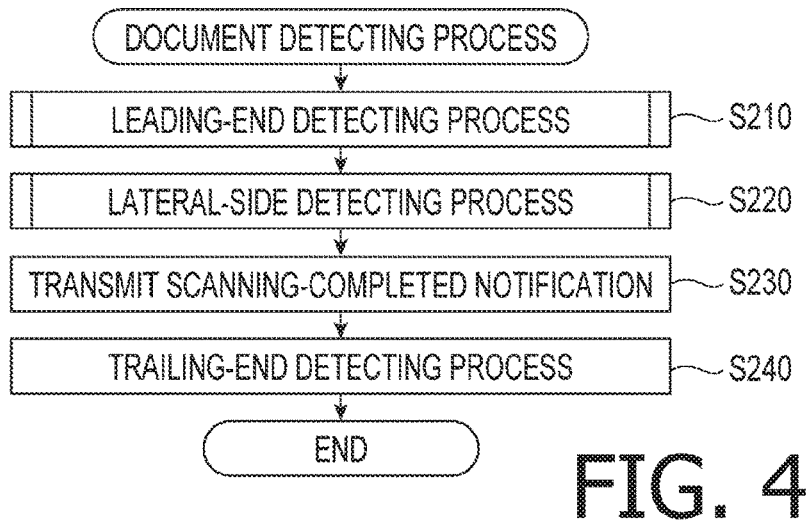
FIG. 4 is a flowchart showing a procedure of a document detecting process to be performed by a document detector of the image scanner in the illustrative embodiment according to one or more aspects of the present disclosure.
Figure 5:
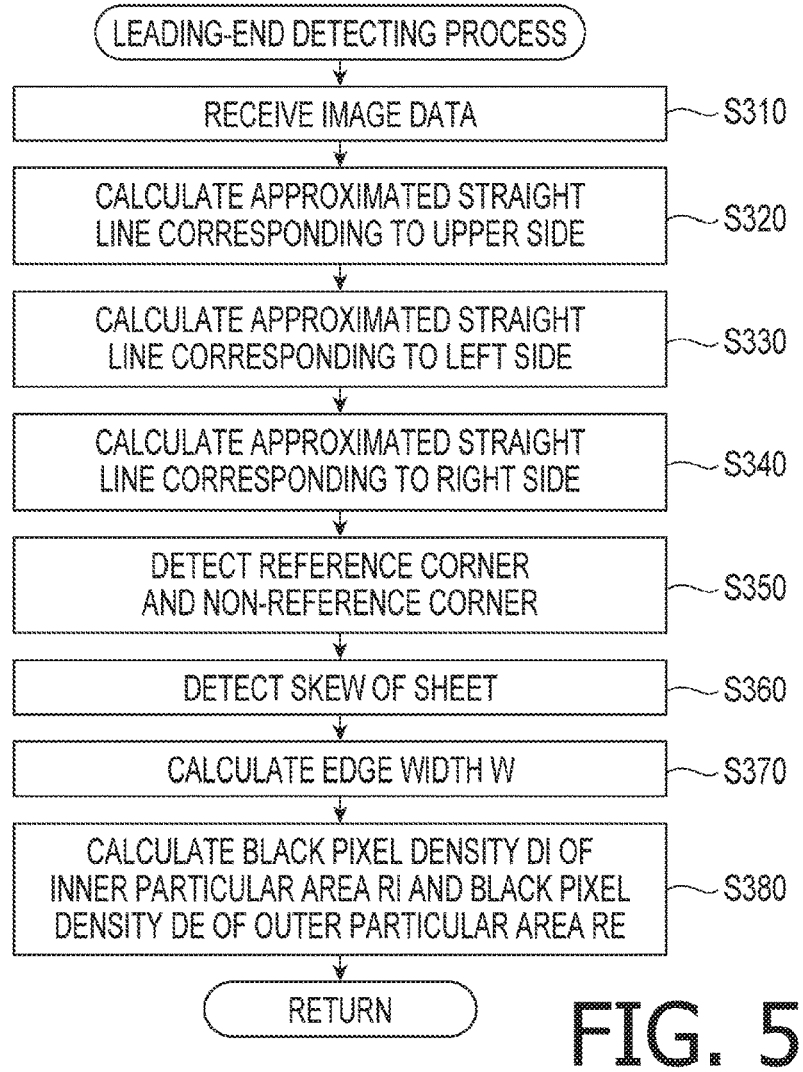
FIG. 5 is a flowchart showing a procedure of a leading-end detecting process to be performed by the document detector in the illustrative embodiment according to one or more aspects of the present disclosure.

In response to being activated when the scanning process has been started, the document detector 57 starts a document detecting process (see FIG. 4). Then, the document detector 57 performs a leading-end detecting process shown in FIG. 5 (S210). In the leading-end detecting process, the document detector 57 receives, from the binarizer 55, image data of a particular number N of lines from a scanning start position of the line image sensor 10 (S310). Hereinafter, the image data received in S310 may be referred to as the "leading-end image data." For instance, the leading-end image data may represent a scanned image having a particular length of a few centimeters (e.g., 3 cm) downstream from the scanning start position of the line image sensor 10 in the sub scanning direction. In other words, the leading-end image data may be generated by the line image sensor 10 repeatedly performing the line scanning the particular number N of times while moving over the particular length (e.g., 3 cm) in the sub scanning direction. In response to completely receiving the leading-end image data from the binarizer 55 after the line image sensor 10 has completed image scanning of the particular number N of lines, the document detector 57 goes to S320.

In S320, the document detector 57 detects edge points corresponding to the upper side of the sheet Q in a scanned image represented by the acquired leading-end image data, and calculates, from the detected edge points, an approximated straight line corresponding to the upper side of the sheet Q. When the sheet Q is not skewed, the upper side of the sheet Q is parallel to the main scanning direction and perpendicular to the sub scanning direction.

Subsequently, in S330, the document detector 57 detects edge points corresponding to the left side of the sheet Q in the scanned image represented by the leading-end image data, and calculates, from the detected edge points, an approximated straight line corresponding to the left side of the sheet Q. Next, in S340, the document detector 57 detects edge points corresponding to the right side of the sheet Q in the scanned image represented by the leading-end image data, and calculates, from the detected edge points, an approximated straight line corresponding to the right side of the sheet Q. When the sheet Q is not skewed, the left and right sides of the sheet Q are perpendicular to the main scanning direction and parallel to the sub scanning direction.

Afterward, in S350, the document detector 57 detects a position of an intersection between the approximated straight line corresponding to the upper side and the approximated straight line corresponding to the left side, as a position of the reference corner QA at a left end of the upper side of the sheet Q. Further, in S350, the document detector 57 detects a position of an intersection between the approximated straight line corresponding to the upper side and the approximated straight line corresponding to the right side, as a position of the non-reference corner QB at a right end of the upper side of the sheet Q. Then, in S360, the document detector 75 detects a skew of the document Q based on an inclination of the approximated straight line corresponding to the upper side.

Further, in S370, the document detector 57 calculates, as an edge width W, a width W of the edge points corresponding to the right side of the sheet Q in the main scanning direction. For instance, the edge width W may be calculated as one of an average, a median, and a mode of the number of black pixels consecutive in the main scanning direction among the edge points corresponding to the right side.

Figure 6:
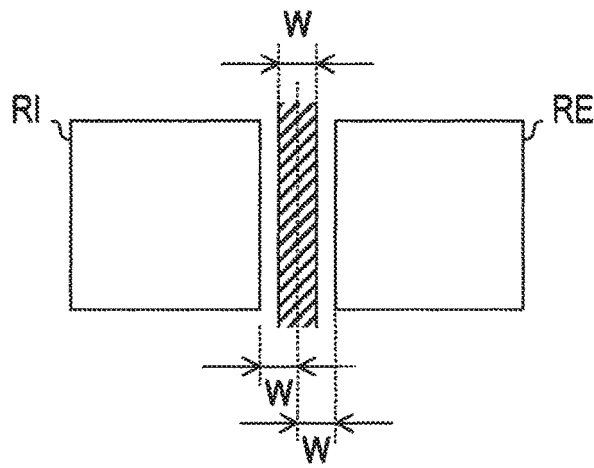
FIG. 6 is an illustration for explaining an edge width, an inner particular area, and an outer particular area of a document sheet (hereinafter, simply referred to as a "sheet"), and black pixel densities of the inner particular area and the outer particular area, in the illustrative embodiment according to one or more aspects of the present disclosure.

Further, as shown in FIG. 6, in S380, the document detector 57 calculates a black pixel density DI and a black pixel density DE. The black pixel density DI represents a density of black pixels in an inner particular area RI of the sheet Q that is defined on the basis of the right side of the sheet Q within the scanned image represented by the leading-end image data. In addition, the black pixel density DE represents a density of black pixels in an outer particular area RE of the sheet Q that is defined on the basis of the right side of the sheet Q within the scanned image represented by the leading-end image data. The inside of the sheet Q is positioned leftward of the right side of the sheet Q in the main scanning direction. The outside of the sheet Q is positioned rightward of the right side of the sheet Q in the main scanning direction. Specifically, the inner particular area RI is a rectangular area extending in the main scanning direction from its right end which is positioned the edge width W leftward away from the approximated straight line corresponding to the right side to its left end which is positioned a prescribed number of pixels leftward away from the right end. For instance, the inner particular area RI may be an area defined by 32×32 pixels. The black pixel density DI of the inner particular area RI is a value obtained by dividing the number of black pixels in the inner particular area RI by the number of all pixels in the inner particular area RI.

The outer particular area RE is a rectangular area extending in the main scanning direction from its left end which is positioned the edge width W rightward away from the approximated straight line corresponding to the right side to its right end which is positioned a prescribed number of pixels rightward away from the left end. For instance, the outer particular area RE may be an area defined by 32×32 pixels. The black pixel density DE of the outer particular area RE is a value obtained by dividing the number of black pixels in the outer particular area RE by the number of all pixels in the outer particular area RE.

Figure 7:
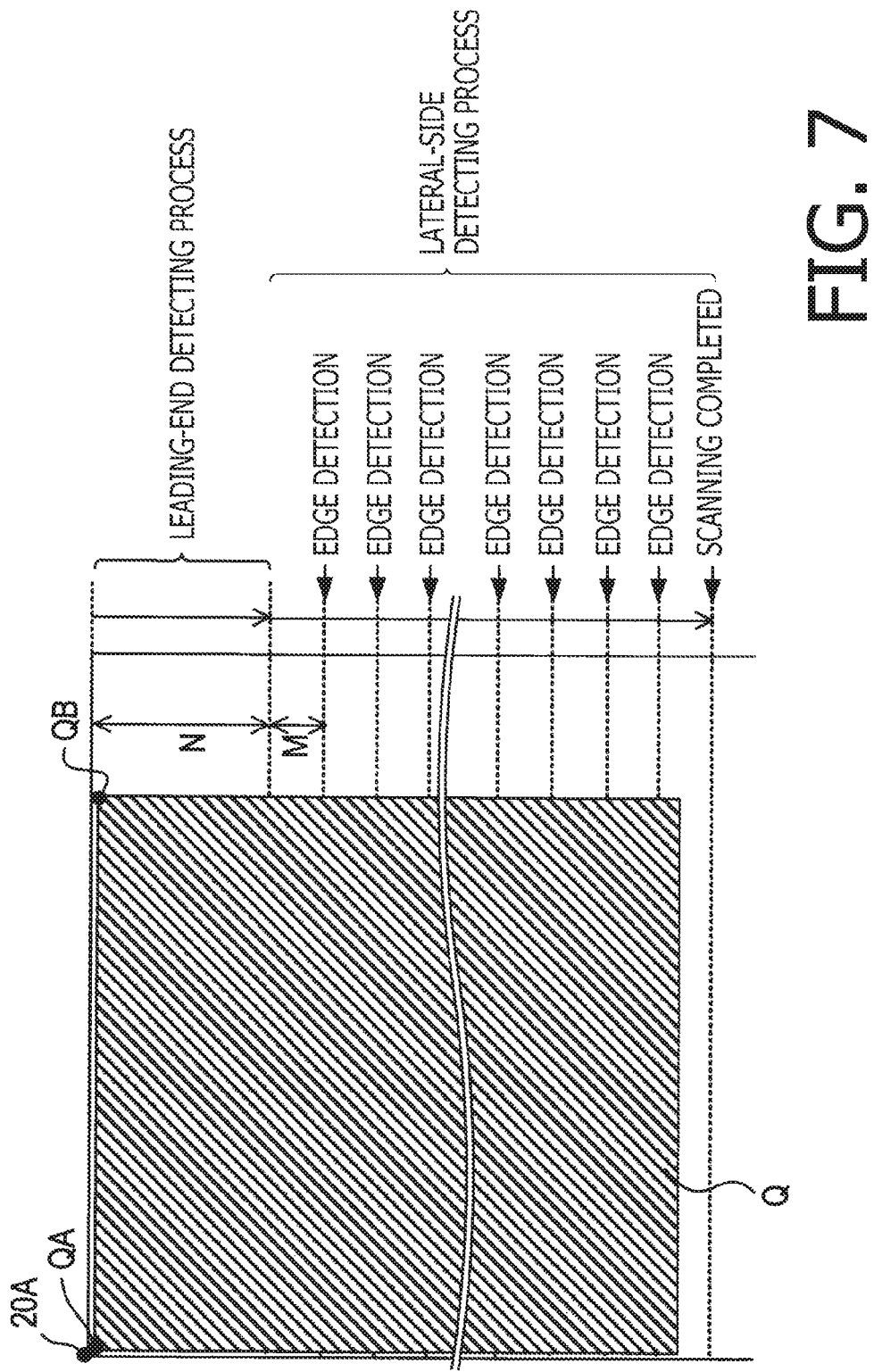
FIG. 7 is an illustration for explaining the leading-end detecting process and a lateral-side detecting process to be performed by the document detector in the illustrative embodiment according to one or more aspects of the present disclosure.

After calculating the black pixel densities DI and DE (S380), the document detector 57 terminates the leading-end detecting process. After completion of the leading-end detecting process (S210), the document detector 57 performs a lateral-side detecting process (S220). In the lateral-side detecting process (S220), as shown in FIG. 7, the document detector 57 performs an edge detecting process each time the line image sensor 10 completes image scanning of a predetermined number M of lines in the sub scanning direction. In each edge detecting process, the document detector 57 detects a right edge corresponding to the right side of the sheet Q, based on image data (hereinafter referred to as "lateral-side image data") representing a scanned image of the predetermined number M of lines.

The predetermined number M of the lines included in each piece of lateral-side image data is much smaller than the particular number N of the lines included in the leading-end image data. For instance, the predetermined number M may be 32. Thus, by setting the predetermined number M much smaller than the particular number N, it is possible to terminate an unnecessary scanning operation immediately after the line image sensor 10 has passed a trailing end of the sheet Q in the sub scanning direction. FIG. 7 shows, merely as a conceptual example, an execution interval (corresponding to the predetermined number M of lines) between consecutive two of the repeated edge detecting processes in the sub scanning direction. Hence, it is noted that a width, in the sub scanning direction, of the execution interval exemplified in FIG. 6 should not be compared with any other elements shown in FIG. 7 such as a size of the sheet Q and a width (corresponding to the particular number N of lines), in the sub scanning direction, of the scanned image corresponding to the leading-end image data acquired in the leading-end detecting process.

In contrast to the leading-end image data acquired in the leading-end detecting process, the lateral-side image data does not have a sufficient number of lines to accurately calculate the approximated straight line corresponding to the right side. Therefore, in the edge detecting process, the right edge may be detected in a below-mentioned method.

Figure 8:
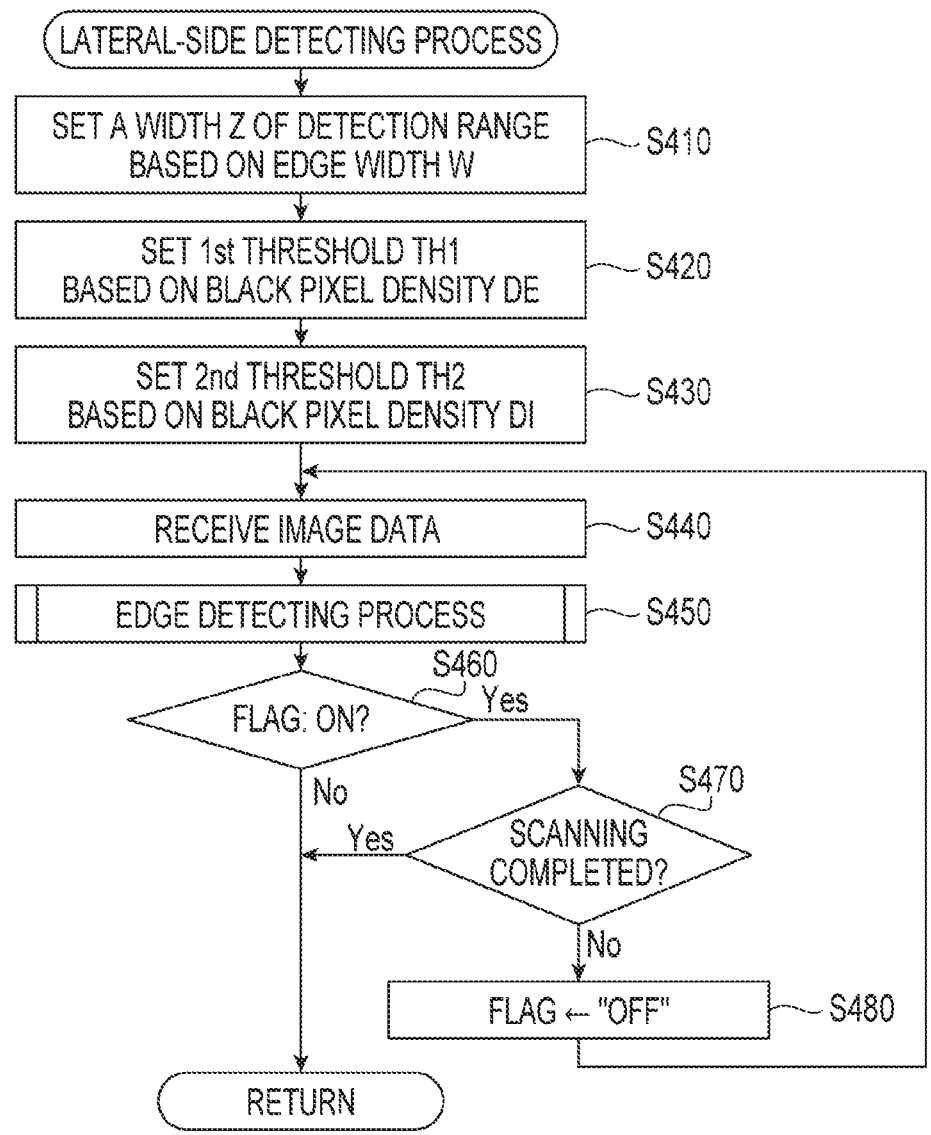
FIG. 8 is a flowchart showing a procedure of the lateral-side detecting process to be performed by the document detector in the illustrative embodiment according to one or more aspects of the present disclosure.

Specifically, in S220, the document detector 57 starts the lateral-side detecting process (see FIG. 8). In the lateral-side detecting process, the document detector 57 sets a width Z of a detection range for detecting document edges, based on the edge width W calculated in the leading-end detecting process (S410). The width Z of the detection range may be set to be a predetermined number of times (e.g., 16 times) as large as the edge width W.

Subsequently, in S420, the document detector 57 sets a first threshold TH1 for determining whether a target area is a "document outside area," based on the black pixel density DE, calculated in the leading-end detecting process, of the outer particular area RE. When a black pixel density DF of the target area is less than the first threshold TH1, the target area is determined to be the "document outside area." The first threshold TH1 may be set to be a predetermined number of times (e.g., two times) as high as the black pixel density DE of the outer particular area RE.

Subsequently, in S430, the document detector 57 sets a second threshold TH2 for determining whether the target area is a "document edge area," based on the black pixel density DI, calculated in the leading-end detecting process, of the inner particular area RI. When the black pixel density DF of the target area is equal to or more than the second threshold TH2, the target area is determined as the "document edge area." The second threshold TH2 may be set to be a predetermined number of times (e.g., two times) as high as the black pixel density DI of the outer particular area RI.

In general, the black pixel density DI of the inner particular area RI is higher than the black pixel density DE of the inner particular area RE. Accordingly, the second threshold TH2 is set higher than the first threshold TH1. In the illustrative embodiment, when the black pixel density DF of the target area is equal to or more than the first threshold TH1 and less than the second threshold TH2, the target area is determined as a "document inside area."

Figure 9A:
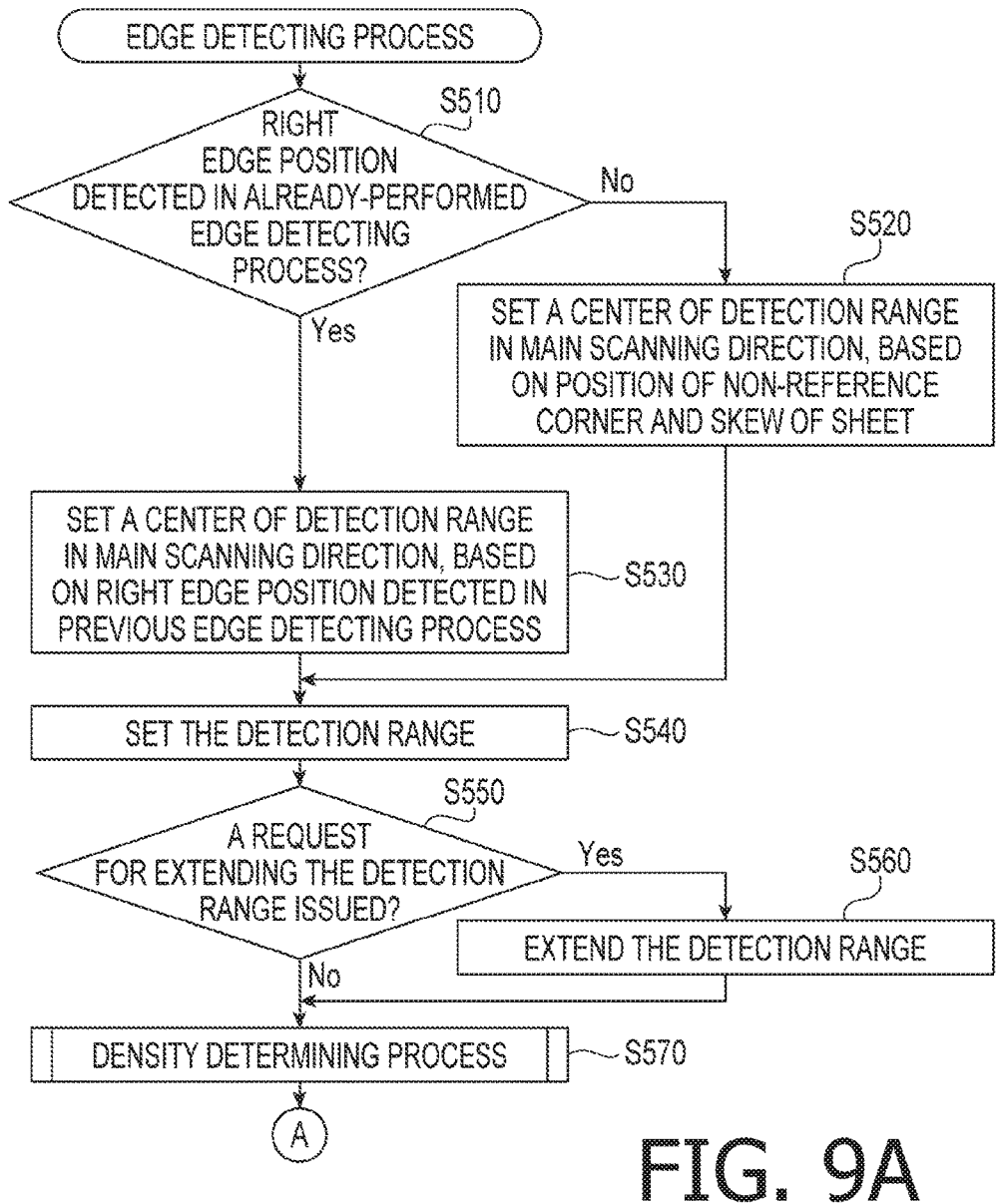
FIGS. 9A and 9B are flowcharts showing a procedure of an edge detecting process to be performed by the document detector in the illustrative embodiment according to one or more aspects of the present disclosure.
Figure 9B:
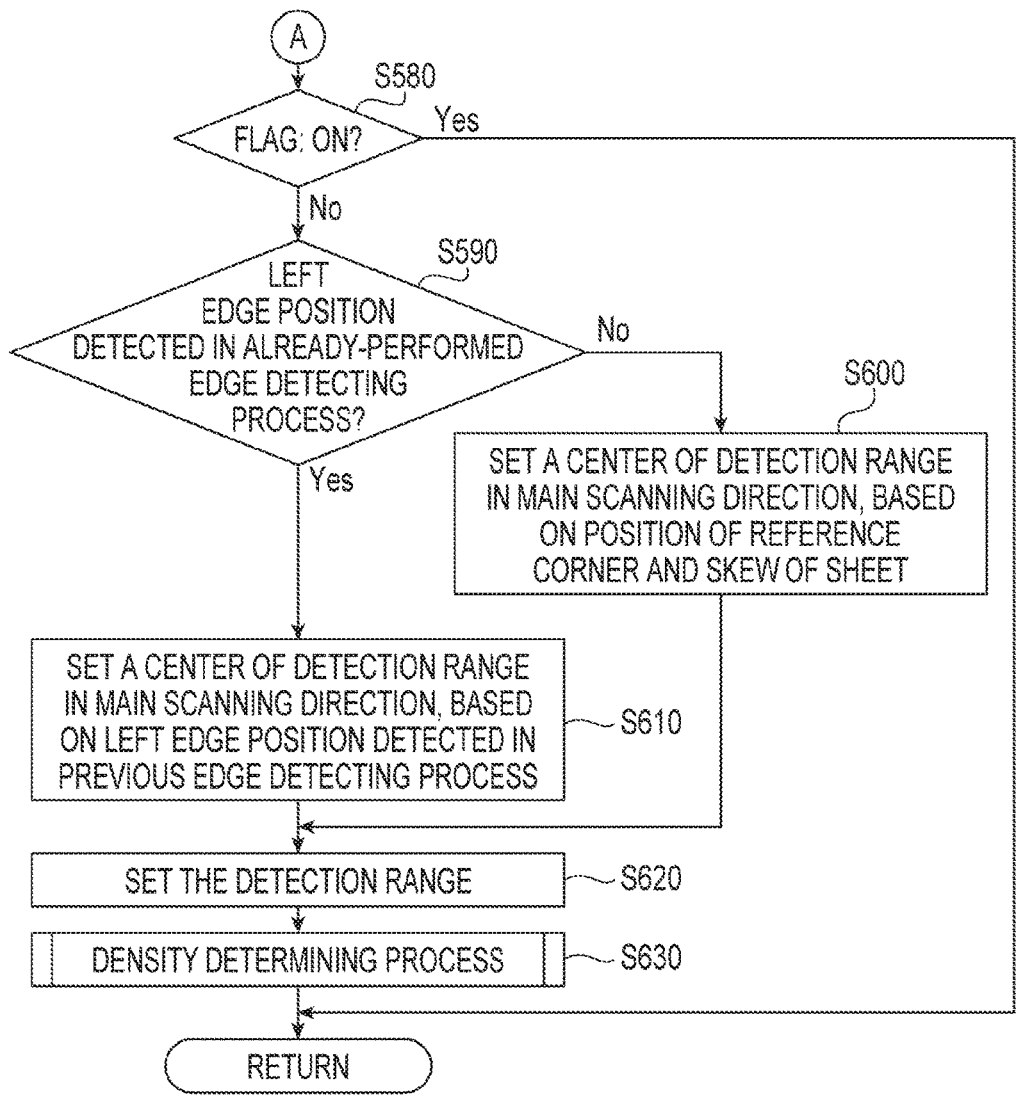

After setting the width Z of the detection range, the first threshold TH1, and the second threshold TH2 through S410 to S430, each time the document detector 57 acquires from the binarizer 55 the lateral-side image data generated by the line image sensor 10 performing image scanning of the predetermined number M of lines (i.e., by the line scanning repeated the predetermined number M of times) (S440), the document detector 57 performs the edge detecting process shown in FIGS. 9A and 9B (S450). In the edge detecting process, the document detector 57 sets a document flag to "ON" when a document edge corresponding to the left side or the right side of the sheet Q has been detected, and maintains the document flag to be "OFF" until a document edge is detected.

In response to determining that the document flag has been set to "ON" in the edge detecting process executed in S450 (S460: Yes), the document detector 57 determines whether the image scanning has been performed up to a terminal end of a maximum scanning range (S470). In response to determining that the image scanning has not been performed up to the terminal end of a maximum scanning range (S470; No), the document detector 57 resets the document flag to "OFF" (S480), and thereafter goes to S440. Thus, the document detector 57 performs the edge detecting process for subsequent lateral-side image data generated by the line image sensor 10 performing image scanning of a next group of the predetermined number M of lines (S450).

Namely, the document detector 57 repeatedly performs the edge detecting process (S450) until there is no further document edge to be detected or until the image scanning is completed up to the terminal end of the maximum scanning range. In response to determining that the document flag is "OFF" (i.e., there is no further document edge to be detected) (S460: No) or that the image scanning has been completed up to the terminal end of the maximum scanning range (S470: Yes), the document detector 57 terminates the lateral-side detecting process (S220), and then goes to S230 (see FIG. 4).

In S230, the document detector 57 provides the main controller 30 with a notification that the image scanning has been completed up to the trailing end (i.e., the downstream end) of the sheet Q in the sub scanning direction. In response to receiving the notification, the main controller 30 controls the line image sensor 10 to stop repeatedly performing the line scanning, and controls the moving mechanism 60 to stop moving the line image sensor 10.

Subsequently, in S240, the document detector 57 performs a trailing-end detecting process. In the trailing-end detecting process, based on the last-acquired lateral-side image data, the document detector 57 detects the trailing end of the sheet Q, i.e., edge points corresponding to the lower side of the sheet Q, and calculates, from the detected edge points, an approximated straight line corresponding to the lower side of the sheet Q. For instance, in the illustrative embodiment, the document detector 57 may detect the edge points by referring to pixels from a downstream end to an upstream end, in the sub scanning direction, of the scanned image represented by the lateral-side image data, thereby calculating the approximated straight line. Afterward, the document detector 57 terminates the document detecting process shown in FIG. 4.

The document detector 57 provides the main controller 30 with positional information of the lower side of the sheet Q detected in the trailing-end detecting process, positional information of the reference corner QA and the non-reference corner QB detected in the leading-end detecting process, and positional information of the upper side of the sheet Q detected in the leading-end detecting process. Based on those pieces of positional information, the main controller 30 performs the trimming process. Furthermore, in order to attain a more appropriate trimming process, the document detector 57 may provide the main controller 30 with positional information of the document edges (i.e., the left and right sides of the sheet Q) detected in the lateral-side detecting process.

Subsequently, the edge detecting process (S450) will be described in detail. After starting the edge detecting process shown in FIGS. 9A and 9B, the document detector 57 determines whether a right edge position (i.e., a position of a document edge corresponding to the right side of the sheet Q) has been detected in an already-performed edge detecting process (S510). In S510 of the edge detecting process performed for the first time after the start of the scanning process, the document detector 57 determines that a right edge position has not been detected in any already-performed edge detecting process (S510: No). Meanwhile, in S510 of the edge detecting process performed for the second or later time after the start of the scanning process, when a right edge position has been detected in at least one of the already-performed edge detecting processes, the document detector 57 makes an affirmative determination (S510: Yes). In another example, when a right edge position has been detected in a previous edge detecting process, the document detector 57 may make an affirmative determination in S510 (S510: Yes). In this case, even though a right edge position has been detected in an edge detecting process before the previous edge detecting process, when a right edge position has not been detected in the previous edge detecting process, the document detector 57 may make a negative determination in S510 (S510: No).

In response to determining that a right edge position has not been detected in an already-performed edge detecting process (S510: No), the document detector 57 sets a center of a detection range (for detecting a right edge) in the main scanning direction, based on the non-reference corner QB and the skew of the sheet Q that have been detected in the leading-end detecting process (S520). Specifically, in S520, the document detector 57 specifies a position (e.g., a center position), in the main scanning direction, of a straight line passing through the non-reference corner QB and having an inclination corresponding to the skew of the sheet Q, within a scanned image represented by lateral-side image data to be processed. It is noted that the straight line defined here corresponds to the right side of the sheet Q. Further, in S520, the document detector 57 sets the specified position as a center of the detection range in the main scanning direction.

Meanwhile, in response to determining that a right edge position has been detected in an already-performed edge detecting process (S510: Yes), the document detector 57 sets the center of the detection range, based on a latest one of right edge positions detected so far (i.e., based on a right edge position detected in the previous edge detecting process) (S530). For example, in S530, the document detector 57 may set the latest right edge position as the center of the detection range in the main scanning direction. In another example of S530, the document detector 57 may specify a position (e.g., a center position), in the main scanning direction, of a straight line passing through the latest right edge position and having the inclination corresponding to the skew of the sheet Q, within the scanned image represented by the lateral-side image data to be processed, and then, may set the specified position as the center of the detection range in the main scanning direction.

Afterward, in S540, the document detector 57 sets, as the detection range, a rectangular area having a width 2 Z in the main scanning direction and a width M in the sub scanning direction. Specifically, in S540, the detection range is set with the width 2 Z in the main scanning direction between a left end that is positioned Z pixels leftward away from the center set in S520 or S530 in the main scanning direction and a right end that is positioned Z pixels rightward away from the same center in the main scanning direction. Further, the detection range set in S540 has the same width M (equivalent to a width of the predetermined number M of lines) as the lateral-side image data in the sub scanning direction. The aforementioned number Z of pixels corresponds to the width Z of the detection range set in S410. The left and the right of the sheet Q are defined as the left and the right in the main scanning direction, respectively. With respect to the right edge position, the left in the main scanning direction corresponds to the inside of the sheet Q, and the right in the main scanning direction corresponds to the outside of the sheet Q.

Afterward, the document detector 57 determines whether a request for extending the detection range has been issued in the previous edge detecting process (S550). In response to determining that a request for extending the detection range has not been issued in the previous edge detecting process (S550: No), the document detector 57 goes to S570. Meanwhile, in response to determining that a request for extending the detection range has been issued in the previous edge detecting process (S550: Yes), the document detector 57 extends the detection range set in S540 (S560). Specifically, in S560, the document detector 57 extends the detection range by shifting the right end of the detection range to a right end of the scanned image represented by the lateral-side image data. Thereafter, the document detector 57 goes to S570.

In S570, the document detector 57 performs a density determining process shown in FIGS. 10, 11, and 12. After starting the density determining process, the document detector 57 determines whether a difference (DI−DE) between the black pixel density DI of the inner particular area RI and the black pixel density DE of the outer particular area RE is more than a predetermined reference value (S710). For instance, when the black pixel densities DI and DE are expressed as percentages, the reference value to be compared with the difference (DI−DE) between them may be 1%.

In response to determining that the difference (DI−DE) is equal to or less than the reference value (S710: No), the document detector 57 sets a width L of the target area to be A1 times as large as the edge width W (S720). Meanwhile, in response to determining that the difference (DI−DE) is more than the reference value (S710: Yes), the document detector 57 sets the width L of the target area to be A2 times as large as the edge width W (S730). The value A2 is larger than the value A1. For instance, A1=2, and A2=4. It is noted that the width L of the target area denotes a width from a center to each end (i.e., each of a left end and a right end) of the target area in the main scanning direction. Therefore, a width between the left end and the right end of the target area in the main scanning direction is 2 L.

After setting the width L in S720 or S730, the document detector 57 sets, as the target area, an area having a left end that is positioned the width L leftward away from the center, set in S520 or S530, of the detection range in the main scanning direction, a right end that is positioned the width L rightward away from the same center of the detection range in the main scanning direction, and the same width (i.e., the width of the predetermined number M of lines) as the detection range in the sub scanning direction (S740).

After setting the target area in S740, the document detector 57 calculates the black pixel density DF of the target area (S750). The black pixel density DF of the target area corresponds to a value obtained by dividing the number of black pixels in the target area by the number of all pixels in the target area. When the width L of the target area is twice as large as the edge width W, and the right edge is entirely included in the target area, the black pixel density DF is 25%. When the width L of the target area is four times as large as the edge width W, and the right edge is entirely included in the target area, the black pixel density DF is 12.5%.

After calculating the black pixel density DF of the target area in S750, the document detector 57 determines whether the calculated black pixel density DF of the target area is less than the aforementioned first threshold TH1, thereby determining whether the target area is the "document outside area" (S760).

In response to determining that the target area is not the "document outside area" (S760: No), the document detector 57 goes to S910. Meanwhile, in response to determining that the target area is the "document outside area" (S760: Yes), the document detector 57 goes to S770.

In S770, the document detector 57 determines whether or not the target area is set to extend to the left end or the right end of the detection range. In response to determining that the target area is set to extend to the left end or the right end of the detection range (S770: Yes), the document detector 57 sets the document flag to "OFF" (S780). This case corresponds to a case where the document detector 57 fails to detect a right edge. Thereafter, the document detector 57 terminates the density determining process.

Meanwhile, in response to determining that the target area is not set to extend to the left end or the right end of the detection range (S770: No), the document detector 57 goes to S800. In S800, the document detector 57 sets a new target area (hereinafter referred to as a "rightward-extended target area") to have a right end shifted rightward from the right end of the current target area in the main scanning direction. Further, in S810, the document detector 57 sets another new target area (hereinafter referred to as a "leftward-extended target area") to have a left end shifted leftward from the left end of the current target area in the main scanning direction. Thus, the document detector 57 sets two new target areas on the basis of the current target area.

More specifically, in S800, the document detector 57 sets, as the rightward-extended target area, the current target area extended by the width L rightward from the right end thereof in the main scanning direction. Further, in S810, the document detector 57 sets, the leftward-extended target area, the current target area extended by the width L leftward from the left end thereof in the main scanning direction. For instance, when the current target area is an area R0 surrounded by a thick frame in FIG. 13, the rightward-extended target area may be set with a range of an area R1 (see FIG. 13) in the main scanning direction. In this case, the leftward-extended target area may be set with a range of an area R2 (see FIG. 13) in the main scanning direction. In FIG. 13, each small rectangular block represents a pixel. Each hatched rectangular block represents a black pixel. Each non-hatched rectangular block represents a white pixel.

Afterward, the document detector 57 calculates a black pixel density DF of the rightward-extended target area (S820). Then, the document detector 57 determines whether the calculated black pixel density DF is less than the first threshold TH1, thereby determining whether the rightward-extended target area is the "document outside area" (S830).

In response to determining that the rightward-extended target area is not the "document outside area" (S830: No), the document detector 57 goes to S910. Meanwhile, in response to determining that the rightward-extended target area is the "document outside area" (S830: Yes), the document detector 57 calculates the black pixel density DF of the leftward-extended target area (S840). Then, the document detector 57 determines whether the calculated black pixel density DF of the leftward-extended target area is less than the first threshold TH1, thereby determining whether the leftward-extended target area is the "document outside area" (S850).

In response to determining that the leftward-extended target area is not a "document outside area" (S850: No), the document detector 57 goes to S910. Meanwhile, in response to determining that the leftward-extended target area is the "document outside area" (S850: Yes), the document detector 57 goes to S860.

In S860, the document detector 57 determines whether or not at least one of the leftward-extended target area and the rightward-extended target area is set to extend to the left end or the right end of the detection range. In response to determining that at least one of the leftward-extended target area and the rightward-extended target area is set to extend to the left end or the right end of the detection range (S860: Yes), the document detector 57 sets the document flag to "OFF" (S780), and then terminates the density determining process. Meanwhile, in response to determining that none of the leftward-extended target area and the rightward-extended target area is set to extend to the left end or the right end of the detection range (S860: No), the document detector 57 sets a new rightward-extended target area to have a right end shifted further rightward from the right end of the current rightward-extended target area in the main scanning direction (S870). Further, the document detector 57 sets a new leftward-extended target area to have a left end shifted further leftward from the left end of the current leftward-extended target area in the main scanning direction (S880).

More specifically, in S870, the document detector 57 sets, as the new rightward-extended target area, the current rightward-extended target area further extended by the width L rightward from the right end thereof in the main scanning direction. Further, in S880, the document detector 57 sets, as the new leftward-extended target area, the current leftward-extended target area further extended by the width L leftward from the left end thereof in the main scanning direction. In FIG. 13, when the current rightward-extended target area has a range of the area R1 in the main scanning direction, the new rightward-extended target area is set with a range of an area R3 in the main scanning direction. Further, when the current leftward-extended target area has the area R2 in the main scanning direction, the new leftward-extended target area is set with a range of an area R4 in the main scanning direction.

After setting the new rightward-extended target area in S870 and setting the new leftward-extended target area in S880, the document detector 57 goes to S820. In S820, the document detector 57 calculates a black pixel density DF of the new rightward-extended target area. Then, based on the determination in S830 as to whether the calculated black pixel density DF of the new rightward-extended target area is less than the first threshold TH1, the document detector 57 goes to S840 or S910.

In S910 (see FIG. 12), the document detector 57 determines whether the black pixel density DF of the current target area is equal to or more than the second threshold TH2, thereby determining whether the current target area is the "document edge area." It is noted that the current target area referred to in S910 after making a negative determination in S830 (S830: No) is the rightward-extended target area. Further, the current target area referred to in S910 after making a negative determination in S850 (S850: No) is the leftward-extended target area.

In response to determining that the current target area is the "document edge area" (S910: Yes), the document detector 57 determines, as a right edge position, a center of the current target area in the main scanning direction (S920). Thereafter, the document detector 57 sets the document flag to "ON" (S980), and then terminates the density determining process. In response to determining that the current target area is not the "document edge area," i.e., that the current target area is the "document inside area" (S910: No), the document detector 57 determines whether the target area is set to extend to the right end of the detection area (S930).

In response to determining that the target area is not set to extend to the right end of the detection area (S930: No), the document detector 57 sets, a new target area, the current target area extended by the width L rightward from the right end thereof in the main scanning direction (S940). Then, the document detector 57 calculates a black pixel density DF of the new target area (S950). Afterward, the document detector 57 goes to S910 and determines whether the target area is the "document edge area," based on the calculated black pixel density DF of the new target area.

In response to determining that the target area is set to extend to the right end of the detection area (S930: Yes), the document detector 57 determines a right edge position to be the same as the center of the current detection range in the main scanning direction (S960). Afterward, the document detector 57 issues a request for extending the detection range in a next edge detecting process (S970). According to the request, in response to the affirmative determination in S550 (S550: Yes), the document detector 57 extends the detection range (S560) in the next edge detecting process (see FIGS. 9A and 9B). After completion of S970, the document detector 57 sets the document flag to "ON" (S980), and then terminates the density determining process.

After completion of the density determining process in S570 (see FIG. 9A), the document detector 57 determines whether the document flag is set to "ON" (S580). In response to determining that the document flag is set to "ON" (S580: Yes), the document detector 57 terminates the edge detecting process. Meanwhile, in response to determining that the document flag is set to "OFF" (S580: No), the document detector 57 performs substantially the same operations as executed in S510 to S570, in S590 to S630 to detect a left edge position.

Specifically, in S590, the document detector 57 determines whether a left edge position (i.e., a position of a document edge corresponding to the left side of the sheet Q) has been detected in an already-performed edge detecting process. In response to determining that a left edge position has not been detected in an already-performed edge detecting process (S590: No), the document detector 57 sets a center of a detection range (for detecting a left edge) in the main scanning direction, based on the reference corner QA and the skew of the sheet Q that have been detected in the leading-end detecting process (S600). Specifically, in S600, the document detector 57 specifies a position (e.g., a center position), in the main scanning direction, of a straight line passing through the reference corner QA and having the inclination corresponding to the skew of the sheet Q, within the scanned image represented by lateral-side image data to be processed. It is noted that the straight line defined here corresponds to the left side of the sheet Q. Further, in S600, the document detector 57 sets the specified position as a center of the detection range in the main scanning direction.

In response to determining that a left edge position has been detected in an already-performed edge detecting process (S590: Yes), the document detector 57 sets the center of the detection range, based on a latest one of left edge positions ever detected (i.e., based on a left edge position detected in the previous edge detecting process) (S610). For example, in S610, the document detector 57 may set the latest left edge position as the center of the detection range in the main scanning direction. In another example of S610, the document detector 57 may specify a position (e.g., a center position), in the main scanning direction, of a straight line passing through the latest left edge position and having the inclination corresponding to the skew of the sheet Q, within the scanned image represented by the lateral-side image data to be processed, and then, may set the specified position as the center of the detection range in the main scanning direction.

Afterward, in S620, the document detector 57 sets, as the detection range, a rectangular area having the width 2 Z in the main scanning direction and the width M in the sub scanning direction. Specifically, in S620, the detection range is set with the width 2 Z in the main scanning direction between a left end that is positioned Z pixels leftward away from the center set in S600 or S610 in the main scanning direction and a right end that is positioned Z pixels rightward away from the same center in the main scanning direction and the same width M (equivalent to a width of the predetermined number M of lines) as the lateral-side image data in the sub scanning direction. The step S620 may include substantially the same operations as executed in S550 to S560 for the aforementioned right edge detection. Specifically, when the instruction to extend the detection range has been issued in the previous edge detecting process, the document detector 57 may extend the detection range by shifting the left end of the detection range to a left end of the scanned image represented by the lateral-side image data. Afterward, the document detector goes to S630 and performs the density determining process.

An exemplary procedure of the density determining process to be executed in S630 is substantially as shown in FIGS. 10, 11, and 12. Nonetheless, it is noted that the density determining process to be executed in S630 is equivalent to such a process that the terms "left" and "right" are replaced with each other in the flowcharts shown in FIGS. 10, 11, and 12 and the relevant descriptions. In other words, the density determining process to be executed in S630 is equivalent to such a process that the relationship between the "left" and the "right" in the main scanning direction is reversed in the density determining process executed in S570.

In the density determining process in S630, the document detector 57 determines whether the target area is the "document edge area," the "document outside area," or the "document inside area," based on the black pixel density of the target area within the detection range. When finding the target area determined to be the "document edge area" or the target area determined to be the "document inside area" within the detection range, the document detector 57 sets the document flag to "ON." Meanwhile, when failing to find the target area determined to be the "document edge area" or the target area determined to be the "document inside area" within the detection range, the document detector 57 sets the document flag to "OFF."

Afterward, the document detector 57 terminates the edge detecting process, and goes to S460 (see FIG. 8). When the document flag is set to "ON" (S460: Yes), the document detector 57 goes to S470. Meanwhile, when the document flag is set to "OFF" (S460: No), the document detector 57 terminates the lateral-side detecting process.

As described above, the image scanner 1 of the illustrative embodiment may prevent erroneous detection of document edges. Then, based on results of the document edge detection, the image scanner 1 may quickly terminate an unnecessary scanning operation after the line image sensor 10 completes image scanning of the trailing end of the sheet Q, and may go to subsequent processing steps such as a trimming process and outputting the image data. Thus, according to the illustrative embodiment, the image scanner 1 may be provided with very useful functions for detecting document edge positions.

As described above, in the leading-end detecting process (S210), the image scanner 1 of the illustrative embodiment detects the position of the non-reference corner QB, the skew of the sheet Q, and the positions of the right side of the sheet Q within the binarized scanned image represented by the leading-end image data generated by the initial image scanning. Then, the image scanner 1 determines the width Z of the detection range and the width L of the target area in the main scanning direction, based on the edge width W corresponding to a width of the right side of the sheet Q. Further, the image scanner 1 sets the first threshold TH1 and the second threshold TH2 for determining whether the target area is the "document outside area," the "document inside area," or the "document edge area," based on the black pixel density DI of the inner particular area RI and the black pixel density DE of the outer particular area RE. It is noted that the inner particular area RI and the outer particular area RE are defined with the right side of the sheet Q as a boundary therebetween within the scanned image represented by the leading-end image data.

In the lateral-side detecting process (S220), each time the line scanning is repeatedly performed the predetermined number M of times, the document detector 57 performs the edge detecting process to detect a document edge based on the lateral-side image data representing a scanned image of the predetermined number M of lines. In the edge detecting process performed for the first time after the start of the scanning process, the document detector 57 sets the center, in the main scanning direction, of the detection range for detecting a right edge, and sets the detection range having the width Z in each direction along the main scanning direction from the set center. More specifically, the center of the detection range in the main scanning direction is set on the basis of the skew of the sheet Q and the position of the non-reference corner QB corresponding to the intersection between the right side and the upper side of the sheet Q detected based on the leading-end image data. In the edge detecting process performed for the second or later time after the start of the scanning process, the document detector 57 basically sets the center, in the main scanning direction, of the detection range for detecting a right edge, on the basis of the right edge position detected in the previous edge detecting process, and sets the detection range having the width Z in each direction along the main scanning direction from the set center.

The document detector 57 selects, as a target area, one of a plurality of areas within the detection range in ascending order of distance between a center of an area to be selected and the center of the detection range in the main scanning direction. The document detector 57 determines whether the target area is the "document outside area," the "document edge area," or the "document inside area," based on the first threshold TH1 and the second threshold TH2. In response to determining that the target area is the "document edge area," the document detector 57 detects, as a right edge, the center of the target area in the main scanning direction. In response to determining that the target area is the "document outside area" or the "document inside area," the document detector 57 selects a next target area to search for the document edge area.

Thus, according to the illustrative embodiment, the image scanner 1 does not merely determine whether the target area is the "document edge area," but determines whether the target area is the "document outside area," the "document edge area," and the "document inside area," based on comparison of the black pixel density of the target area with the first threshold TH1 and the second threshold TH2. Therefore, the image scanner 1 may properly search for the "document edge area," accurately detect a lateral side of the sheet Q, and correctly determine whether the sheet Q exists in a position within the scanned image represented by the image data, through the detection of the lateral side of the sheet Q.

Further, in the illustrative embodiment, when the target area is determined to be the "document outside area," the image scanner 1 extends the target area rightward and leftward in the main scanning direction to search for the document edge area. When the target area is determined to be the "document inside area," the image scanner 1 extends the target area outward of the sheet Q in the main scanning direction to search for the document edge area. Thus, in the illustrative embodiment, the image scanner 1 may appropriately select a next target area, depending on whether the current target area is the "document outside area" or the "document inside area." Accordingly, the image scanner 1 may properly and quickly detect the document edge area.

Further, in the illustrative embodiment, the image scanner 1 determines the width L of the target area in the main scanning direction, depending on the difference (DI-DE) between the black pixel density DI of the inner particular area RI and the black pixel density DE of the outer particular area RE, based on the leading-end image data. Hence, the image scanner 1 may appropriately detect the document edge area. Moreover, the image scanner 1 sets the width L of the target area to become larger as the edge width W increases. Therefore, the image scanner 1 may accurately detect the document edge area, regardless of the edge width W.

Further, in the illustrative embodiment, when the image scanner 1 has detected the "document inside area" but has not detected the "document edge area" within the detection range, the image scanner 1 extends the detection range outward of the sheet Q in the main scanning direction. Hence, the image scanner 1 may appropriately detect the "document edge area."

Hereinabove, the illustrative embodiment according to aspects of the present disclosure has been described. The present disclosure can be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that the present disclosure can be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that the present disclosure is capable of use in various other combinations and environments and is capable of changes or modifications within the scope of the inventive concept as expressed herein. For instance, according to aspects of the present disclosure, the image scanner 1 may be configured not to perform any process for detecting a left edge of the sheet Q in the main scanning direction.

In the aforementioned illustrative embodiment, as shown in FIG. 13, the document detector 57 sequentially selects new target areas by gradually extending the initial target area R0 by an increment of the width L in respective directions along the main scanning direction. Nonetheless, instead of that method, the document detector 57 may sequentially select new target areas by gradually moving the initial target area R0 by a unit distance of the width L in respective directions along the main scanning direction. In this modification, in each of the steps S800, S870, and S940, the document detector 57 may set, as a new target area, the current target area moved by the width L rightward from a current position thereof in the main scanning direction. Further, in each of the steps 810 and S880, the document detector 57 may set, as another new target area, the current target area moved by the width L leftward from the current position thereof in the main scanning direction.

The aforementioned illustrative embodiment is based on an assumption that the black pixel density DI of the inner particular area RI of the sheet Q is more than the black pixel density DE of the outer particular area RE. Nonetheless, if the black pixel density DI is equal to or less than the black pixel density DE, in the density determining process, the document detector 57 may perform S740 and subsequent steps after setting the width L in S720. The first threshold TH1 may be corrected such that the corrected first threshold TH1 is less than the second threshold TH2. The image scanner 1 may be configured to, when the black pixel density DI is equal to or less than the black pixel density DE, perform an error process or continuously perform image scanning up to the terminal end of the maximum scanning range.

It is needless to say that the aforementioned specific numerical values, such as the particular number N of lines, the predetermined number M of lines, and the number Z of pixels, are merely exemplary values. One or more functions of a single element in the aforementioned illustrative embodiment may be dispersedly provided to and/or achieved by a plurality of elements. Functions of a plurality of elements in the aforementioned illustrative embodiment may be integrally provided to and/or achieved by a single element. One or some of the elements exemplified in the aforementioned illustrative embodiment may be omitted. At least a part of the elements exemplified in the aforementioned illustrative embodiment may be added to or replaced with other elements according to aspects of the present disclosure. It should be recognized that any aspects within the scope of the inventive concept as expressed herein may be illustrative embodiments or modifications according to the present disclosure.

Associations between elements exemplified in the aforementioned illustrative embodiment and elements according to aspects of the present disclosure will be exemplified below. The image scanner 1 may be an example of an "image scanner" according to aspects of the present disclosure. The document table 20 may be an example of a "document table" according to aspects of the present disclosure. The line image sensor 10 may be an example of an "image sensor" according to aspects of the present disclosure. The binarizer 55 may be an example of a "binarizer" according to aspects of the present disclosure. The document detector 57 may be an example of a "document detector" according to aspects of the present disclosure. Further, the processor 57A and the memory 57B storing the programs 57C may be included in the "document detector" according to aspects of the present disclosure. The memory 57B may be an example of a "non-transitory computer-readable medium" according to aspects of the present disclosure. The moving mechanism 60 may be an example of a "mover" according to aspects of the present disclosure. Further, the motor 65 and the motor controller 70 may be included in the "mover" according to aspects of the present disclosure. The main controller 30 may be an example of a "controller" according to aspects of the present disclosure.

What is claimed is:

1. An image scanner comprising:
a document table configured to support a rectangular sheet placed thereon, the document table having a specific position thereon where one of four corners of the sheet is placed as a reference corner;
an image sensor configured to repeatedly perform line scanning to scan the sheet placed on the document table in a main scanning direction while moving in a sub scanning direction perpendicular to the main scanning direction, thereby generating image data representing a scanned image of the sheet;
a binarizer configured to binarize the image data generated by the image sensor; and
a document detector configured to:
receive first image data from the binarizer, the first image data being generated by binarizing image data generated by the image sensor repeatedly performing the line scanning a particular number of times while moving in the sub scanning direction from a scanning start position;
detect a first position of a lateral side of the sheet within a first scanned image represented by the received first image data, the lateral side extending in the sub scanning direction from a non-reference corner of the sheet, the non-reference corner being opposed to the reference corner across an upper side of the sheet in the main scanning direction, the upper side extending in the main scanning direction from the reference corner;
calculate an inner black pixel density and an outer black pixel density based on the first image data, the inner black pixel density being a density of black pixels in an inner particular area, the outer black pixel density being a density of black pixels in an outer particular area, the inner particular area and the outer particular area being defined with the detected first position of the lateral side as a boundary therebetween;
set a plurality of thresholds based on the calculated inner black pixel density and the calculated outer black pixel density;
each time the image sensor repeatedly performs the line scanning a predetermined number of times while moving in the sub scanning direction, perform an edge detecting process to detect a second position of the lateral side by detecting a document edge corresponding to the lateral side in the main scanning direction within a second scanned image represented by second image data received from the binarizer, the second image data being generated by binarizing image data generated by the line scanning repeated the predetermined number of times;
in the edge detecting process performed for a first time, set a reference position based on the detected first position of the lateral side;
in the edge detecting process performed for a second or later time, set the reference position based on the second position of the lateral side detected in a previous edge detecting process; and
in each edge detecting process, perform:
defining a detection range on the basis of the set reference position;
selecting a target area from among a plurality of areas within the defined detection range, in ascending order of distance between an area to be selected as the target area and the reference position;
determining whether the selected target area is a document outside area, a document inside area, or a document edge area, by comparing a black pixel density of the target area with the plurality of thresholds;
in response to determining that the target area is the document outside area or the document inside area, selecting one or more new target areas from among the plurality of areas within the detection range; and in response to determining that the target area is the document edge area, detecting a specific position in the target area as the second position of the lateral side.

2. The image scanner according to claim 1,
wherein the plurality of thresholds include a first threshold and a second threshold, and
wherein the document detector is further configured to:
set the first threshold based on the outer black pixel density of the outer particular area;
set the second threshold based on the inner black pixel density of the inner particular area, the second threshold being higher than the first threshold;
in response to determining that the black pixel density of the target area is equal to or more than the second threshold, determine that the target area is the document edge area, and detect the specific position in the target area as the second position of the lateral side;
in response to determining that the black pixel density of the target area is equal to or more than the first threshold and less than the second threshold, determine that the target area is the document inside area;
in response to determining that the black pixel density of the target area is less than the first threshold, determine that the target area is the document outside area; and
select the one or more new target areas, depending on whether the target area is the document outside area or the document inside area.

3. The image scanner according to claim 1,
wherein the document detector is further configured to:
in response to determining that the target area is the document outside area, select, as a first new target area, the target area extended in a first direction along the main scanning direction, and select, as a second new target area, the target area extended in a second direction along the main scanning direction; and
in response to determining that the target area is the document inside area, select, as a new target area, the target area extended outward of the sheet in the main scanning direction.

4. The image scanner according to claim 1,
wherein the document detector is further configured to:
determine a width of the target area in the main scanning direction, depending on a difference between the inner black pixel density of the inner particular area and the outer black pixel density of the outer particular area.

5. The image scanner according to claim 4,
wherein the document detector is further configured to:
in response to determining that the difference between the inner black pixel density and the outer black pixel density is more than a reference value, determine the width of the target area in the main scanning direction to be larger than when the difference between the inner black pixel density and the outer black pixel density is equal to or less than the reference value.

6. The image scanner according to claim 1,
wherein the document detector is further configured to:
detect, as an edge width, a width of a black pixel area corresponding to the lateral side in the main scanning direction within the first scanned image; and
determine a width of the target area in the main scanning direction to become larger as the detected edge width increases.

7. The image scanner according to claim 1,
wherein the document detector is further configured to:
detect, as an edge width, a width of a black pixel area corresponding to the lateral side in the main scanning direction within the first scanned image; and
determine a width of the detection range in the main scanning direction to become larger as the detected edge width increases.

8. The image scanner according to claim 1,
wherein the document detector is further configured to:
in response to finding the target area determined to be the document inside area but failing to find the target area determined to be the document edge area, determine a latest position of the lateral side ever detected, as the second position of the lateral side; and
in a next edge detecting process, set the reference position based on the latest position of the lateral side ever detected.

9. The image scanner according to claim 1,
wherein the document detector is further configured to:
in response to finding the target area determined to be the document inside area but failing to find the target area determined to be the document edge area, issue a request for extending the detection range outward of the sheet in the main scanning direction; and
in a next edge detecting process, extend the detection range outward of the sheet in the main scanning direction in accordance with the issued request.

10. The image scanner according to claim 1, further comprising:
a mover configured to move the image sensor in the sub scanning direction;
a controller configured to control the image sensor to repeatedly perform the line scanning while controlling the mover to move the image sensor in the sub scanning direction,
wherein the document detector is further configured to:
in response to finding the target area determined to be the document inside area or the target area determined to be the document edge area, determine that the sheet exists within the detection range; and
in response to failing to find the target area determined to be the document inside area or the target area determined to be the document edge area, determine that the sheet does not exist within the detection range, and
wherein the controller is further configured to:
in response to the document detector determining that the sheet does not exist within the detection range, control the image scanner to stop repeatedly performing the line scanning.

11. The image scanner according to claim 1,
wherein the document detector comprises:
a processor; and
a memory storing processor-executable instructions configured to, when executed by the processor, cause the processor to detect the non-reference corner and repeatedly perform the edge detecting process.

12. A method implementable on a processor coupled with an image scanner, the image scanner comprising:
a document table configured to support a rectangular sheet placed thereon, the document table having a specific position thereon where one of four corners of the sheet is placed as a reference corner;
an image sensor configured to repeatedly perform line scanning to scan the sheet placed on the document table in a main scanning direction while moving in a sub scanning direction perpendicular to the main scanning direction, thereby generating image data representing a scanned image of the sheet; and a binarizer configured to binarize the image data generated by the image sensor, the method comprising:

receiving first image data from the binarizer, the first image data being generated by binarizing image data generated by the image sensor repeatedly performing the line scanning a particular number of times while moving in the sub scanning direction from a scanning start position;

detecting a first position of a lateral side of the sheet within a first scanned image represented by the received first image data, the lateral side extending in the sub scanning direction from a non-reference corner of the sheet, the non-reference corner being opposed to the reference corner across an upper side of the sheet in the main scanning direction, the upper side extending in the main scanning direction from the reference corner;

calculating an inner black pixel density and an outer black pixel density based on the first image data, the inner black pixel density being a density of black pixels in an inner particular area, the outer black pixel density being a density of black pixels in an outer particular area, the inner particular area and the outer particular area being defined with the detected first position of the lateral side as a boundary therebetween;

setting a plurality of thresholds based on the calculated inner black pixel density and the calculated outer black pixel density;

each time the image sensor repeatedly performs the line scanning a predetermined number of times while moving in the sub scanning direction, performing an edge detecting process to detect a second position of the lateral side by detecting a document edge corresponding to the lateral side in the main scanning direction within a second scanned image represented by second image data received from the binarizer, the second image data being generated by binarizing image data generated by the line scanning repeated the predetermined number of times;

in the edge detecting process performed for a first time, setting a reference position based on the detected first position of the lateral side;

in the edge detecting process performed for a second or later time, setting the reference position based on the second position of the lateral side detected in a previous edge detecting process; and in each edge detecting process, performing:
  defining a detection range on the basis of the set reference position;
  selecting a target area from among a plurality of areas within the defined detection range, in ascending order of distance between an area to be selected as the target area and the reference position;
  determining whether the selected target area is a document outside area, a document inside area, or a document edge area, by comparing a black pixel density of the target area with the plurality of thresholds;
  in response to determining that the target area is the document outside area or the document inside area, selecting one or more new target areas from among the plurality of areas within the detection range; and
  in response to determining that the target area is the document edge area, detecting a specific position in the target area as the second position of the lateral side.

13. A non-transitory computer-readable medium storing computer-readable instructions that are executable by a processor coupled with an image scanner, the image scanner comprising:

a document table configured to support a rectangular sheet placed thereon, the document table having a specific position thereon where one of four corners of the sheet is placed as a reference corner;

an image sensor configured to repeatedly perform line scanning to scan the sheet placed on the document table in a main scanning direction while moving in a sub scanning direction perpendicular to the main scanning direction, thereby generating image data representing a scanned image of the sheet; and a binarizer configured to binarize the image data generated by the image sensor, the instructions being configured to, when executed by the processor, cause the processor to:

receive first image data from the binarizer, the first image data being generated by binarizing image data generated by the image sensor repeatedly performing the line scanning a particular number of times while moving in the sub scanning direction from a scanning start position;

detect a first position of a lateral side of the sheet within a first scanned image represented by the received first image data, the lateral side extending in the sub scanning direction from a non-reference corner of the sheet, the non-reference corner being opposed to the reference corner across an upper side of the sheet in the main scanning direction, the upper side extending in the main scanning direction from the reference corner;

calculate an inner black pixel density and an outer black pixel density based on the first image data, the inner black pixel density being a density of black pixels in an inner particular area, the outer black pixel density being a density of black pixels in an outer particular area, the inner particular area and the outer particular area being defined with the detected first position of the lateral side as a boundary therebetween;

set a plurality of thresholds based on the calculated inner black pixel density and the calculated outer black pixel density;

each time the image sensor repeatedly performs the line scanning a predetermined number of times while moving in the sub scanning direction, perform an edge detecting process to detect a second position of the lateral side by detecting a document edge corresponding to the lateral side in the main scanning direction within a second scanned image represented by second image data received from the binarizer, the second image data being generated by binarizing image data generated by the line scanning repeated the predetermined number of times;

in the edge detecting process performed for a first time, set a reference position based on the detected first position of the lateral side;

in the edge detecting process performed for a second or later time, set the reference position based on the second position of the lateral side detected in a previous edge detecting process; and in each edge detecting process, perform:
- defining a detection range on the basis of the set reference position;
- selecting a target area from among a plurality of areas within the defined detection range, in ascending order of distance between an area to be selected as the target area and the reference position;
- determining whether the selected target area is a document outside area, a document inside area, or a document edge area, by comparing a black pixel density of the target area with the plurality of thresholds;
- in response to determining that the target area is the document outside area or the document inside area, selecting one or more new target areas from among the plurality of areas within the detection range; and
- in response to determining that the target area is the document edge area, detecting a specific position in the target area as the second position of the lateral side.

* * * * *